US011216454B1

(12) United States Patent
Cole et al.

(10) Patent No.: US 11,216,454 B1
(45) Date of Patent: Jan. 4, 2022

(54) USER DEFINED FUNCTIONS FOR DATABASE QUERY LANGUAGES BASED ON CALL-BACK FUNCTIONS

(71) Applicant: Actian Corporation, Palo Alto, CA (US)

(72) Inventors: Richard L. Cole, Los Gatos, CA (US); Yijou Chen, Cupertino, CA (US); Eugene Szedenits, Jr., Ypsilanti, MI (US)

(73) Assignee: ACTIAN SUB III, INC., Palo Alto, CA (US)

( * ) Notice: Subject to any disclaimer, the term of this patent is extended or adjusted under 35 U.S.C. 154(b) by 298 days.

(21) Appl. No.: 15/411,993

(22) Filed: Jan. 21, 2017

Related U.S. Application Data

(63) Continuation of application No. 13/720,854, filed on Dec. 19, 2012, now abandoned.

(Continued)

(51) Int. Cl.
*G06F 16/2455* (2019.01)
*G06F 16/2453* (2019.01)
(Continued)

(52) U.S. Cl.
CPC .......... *G06F 16/24532* (2019.01); *G06F 8/30* (2013.01); *G06F 8/447* (2013.01); *G06F 16/212* (2019.01); *G06F 16/2455* (2019.01)

(58) Field of Classification Search
CPC ......... G06F 17/30445; G06F 16/24532; G06F 16/2455; G06F 16/212; G06F 8/30; G06F 8/447
(Continued)

(56) References Cited

U.S. PATENT DOCUMENTS 6,338,056 B1   1/2002  Dessloch et al.
6,732,084 B1   5/2004  Kabra et al.
(Continued)

OTHER PUBLICATIONS

Friedman, E. et al., "SQL/MapReduce: A Practical Approach to Self-Describing, Polymorphic, and Parallelizable User-Defined Functions," VLDB'09, Aug. 24-28, 2009, ACM, pp. 1402-1413, Can be retrieved at Internet<URL:http://www.asterdata.com/resources/assets/sqlmr.pdf>.

(Continued)

*Primary Examiner* — Hicham Skhoun
(74) *Attorney, Agent, or Firm* — Arent Fox LLP

(57) ABSTRACT

A parallel database system processes database queries invoking a user defined function (UDF). The database query is specified in a database query language, for example, the structured query language (SQL) and the UDF is specified in a programming language different from the database query language, for example, C/C++. The UDF may include multiple phases. The parallel database system generates optimized code for the UDF. The parallel database system includes a leader node and a plurality of compute nodes. The database query processes one or more database tables such that each compute node processes a slice of each database table. The leader node sets up a global context structure and provides it to each compute node. The global context may be shared across multiple executions of the query. The UDF may be used for efficient execution of extraction, transformation, and loading of data from external systems.

18 Claims, 7 Drawing Sheets

Related U.S. Application Data

(60) Provisional application No. 61/643,043, filed on May 4, 2012, provisional application No. 61/577,558, filed on Dec. 19, 2011.

(51) Int. Cl.
 *G06F 8/30* (2018.01)
 *G06F 8/41* (2018.01)
 *G06F 16/21* (2019.01)

(58) Field of Classification Search
 USPC .......................................................... 707/769
 See application file for complete search history.

(56) References Cited

U.S. PATENT DOCUMENTS

| | | | |
|---|---|---|---|
| 6,938,044 B1 | 8/2005 | Milby | |
| 7,127,456 B1 | 10/2006 | Brown et al. | |
| 7,752,213 B2 | 7/2010 | Todd | |
| 7,844,620 B2 | 11/2010 | Barsness et al. | |
| 7,885,969 B2 | 2/2011 | Natarajan et al. | |
| 7,984,043 B1 | 7/2011 | Waas | |
| 8,290,935 B1 | 10/2012 | Lopes et al. | |
| 8,606,744 B1* | 12/2013 | Dageville | G06F 17/30557 707/602 |
| 8,612,989 B1 | 12/2013 | Richards et al. | |
| 2006/0031233 A1* | 2/2006 | Liu | G06F 40/14 |
| 2006/0155725 A1* | 7/2006 | Foster | G06F 16/88 |
| 2009/0276482 A1 | 11/2009 | Rae et al. | |
| 2010/0241646 A1* | 9/2010 | Friedman | G06F 17/30445 707/764 |
| 2012/0124100 A1 | 5/2012 | Schabenberger et al. | |
| 2012/0191699 A1* | 7/2012 | George | G06F 16/24554 707/718 |
| 2012/0191732 A1 | 7/2012 | George | |
| 2013/0144815 A1 | 6/2013 | Luo et al. | |
| 2013/0152057 A1* | 6/2013 | Ke | G06F 8/453 717/132 |
| 2013/0297976 A1 | 11/2013 | McMillen | |
| 2014/0114950 A1 | 4/2014 | Halverson et al. | |

OTHER PUBLICATIONS

"Chapter 39. PL/pgSQL—SQL Procedural Language," PostgreSQL, The PostgreSQL Global Development Group, 1996-2013, 1 page, [Online] [Retrieved on Feb. 28, 2013] Retrieved at URL<http://www.postgresql.org/docs/current/static/plpgsql.html>.

United States Office Action, U.S. Appl. No. 13/720,854, dated Mar. 22, 2016, 20 pages.

United States Office Action, U.S. Appl. No. 13/720,854, dated Jun. 4, 2015, 17 pages.

United States Office Action, U.S. Appl. No. 13/720,854, dated Jan. 16, 2015, 15 pages.

United States Office Action, U.S. Appl. No. 13/720,854, dated Jun. 20, 2014, 10 pages.

* cited by examiner

USER DEFINED FUNCTIONS FOR DATABASE QUERY LANGUAGES BASED ON CALL-BACK FUNCTIONS

CROSS REFERENCES TO RELATED APPLICATIONS

This application is a continuation of U.S. patent application Ser. No. 13/720,854, filed on Dec. 19, 2012, which claims the benefit of U.S. Provisional Application No. 61/577,558 filed on Dec. 19, 2011 and U.S. Provisional Application No. 61/643,043 filed on May 4, 2012, each of which is incorporated by reference in its entirety.

BACKGROUND

This invention relates generally to user defined functions for database query languages, and in particular to efficient execution of user defined functions based on call-back functions.

Enterprises often store their data in databases. For example, an enterprise may store information describing employees, customers, products, financial transactions, and the like in databases. These databases provide functionality for managing data including updates to the data as well as querying the data. As enterprises grow, the amount of data that they need to store in databases keeps increasing. For example, as the number of customers, the number of products, or the number of transactions executed by the enterprise increases, the size of data stored in the database grows. The performance of a database often depends on the size of the data stored in the database. Parallel architectures are being utilized to improve performance of databases storing large amount of data.

Database execution models that work on single processor machines may not be able to effectively utilize a parallel machine without modifications. To be able to effectively utilize the available resources in parallel databases, database functionality must often be re-implemented for the parallel architecture. Typically, the details of an underlying architecture and the details of how the database implements specific features are hidden from the end user of the database.

To hide the implementation details of how data is processed within the database, databases typically support standard interfaces that allow an end user to access the data. Most databases support the structured query language (SQL) for manipulating and accessing data. Some databases allow users to customize the functionality of the interface of the database using programming languages other than SQL, for example, by writing functions in C or C++. The functions are called user defined functions (UDFs) and may be compiled and executed as part of the server code. These functions can be used similar to the built-in functions of SQL and can be invoked from SQL statements.

An end user of the database who invokes the UDF may be an expert in a particular domain but not an expert in parallel architectures or database. End users typically treat the UDF as a black box that provides a given functionality. For example, if a UDF performs pattern matching using a complex process, the end user may call the UDF for pattern matching without knowing the details of the complex process.

Conventional techniques of implementing UDFs typically require an end user to be aware of the underlying architecture and the process executed by the UDF to effectively utilize the parallel architecture. Requiring the end user of a database to have an understanding of the parallel architecture of the database or the specification of the UDF places significant burden on the end user and may result in inefficient use of the parallel machine and the UDF.

SUMMARY

Embodiments of the invention allow use of a global context in user defined functions (UDFs) specified for a parallel database using a language other than the query language of the database. For example, the database query language may be structured query language (SQL) whereas the UDF may be defined in C or C++. The UDF allows a user to customize the database functionality and can invoked from a SQL statements like other built-in functions of SQL. The parallel database may include a leader node and a plurality of compute nodes, each compute node assigned a slice of a table being processed by a query. The use of a global context allows a user to set up a data structure that is used during the evaluation of a query. For example, the global context can be a mapping from zip codes to states that is used in an SQL query that processes a table having an address column. The global context is used by each compute node for processing the slice of data assigned to the compute node.

The parallel database receives the specification of a UDF and a query that invokes the UDF on rows of a database table. The parallel database sets up a global context structure for invocation by the database query. The leader node initializes the global context structure by retrieving information from another database table or a set of database tables. In an embodiment, the global context can be constructed using information obtained from an external data source, for example, another database system. The leader node sends the information describing the global context structure to each compute node. Each compute node reconstructs a local copy of the global context structure. The database query is executed one or more times, each execution reusing the global context structure previously set up. The execution of the query is performed by each compute node using the local copy of the global context structure. The result of the query is returned to a requestor.

In an embodiment, the database supports a command of the database query language to allow a user to define a global context, for example, by specifying a query that retrieves the data used to set up the global context. In another embodiment, the instructions for defining a global context are specified in the UDF, using the programming language used for specifying the UDF.

In an embodiment, the global context is set up once for a prepared statement and then reused for every execution of the prepared statement. In another embodiment, the global context is reused for every independent execution of a statement. However, two separate invocations of a UDF within the same SQL statement use two separate global context structures. This allows each invocation of the UDF to set up the global context structure independent of other invocations.

Figure 1:
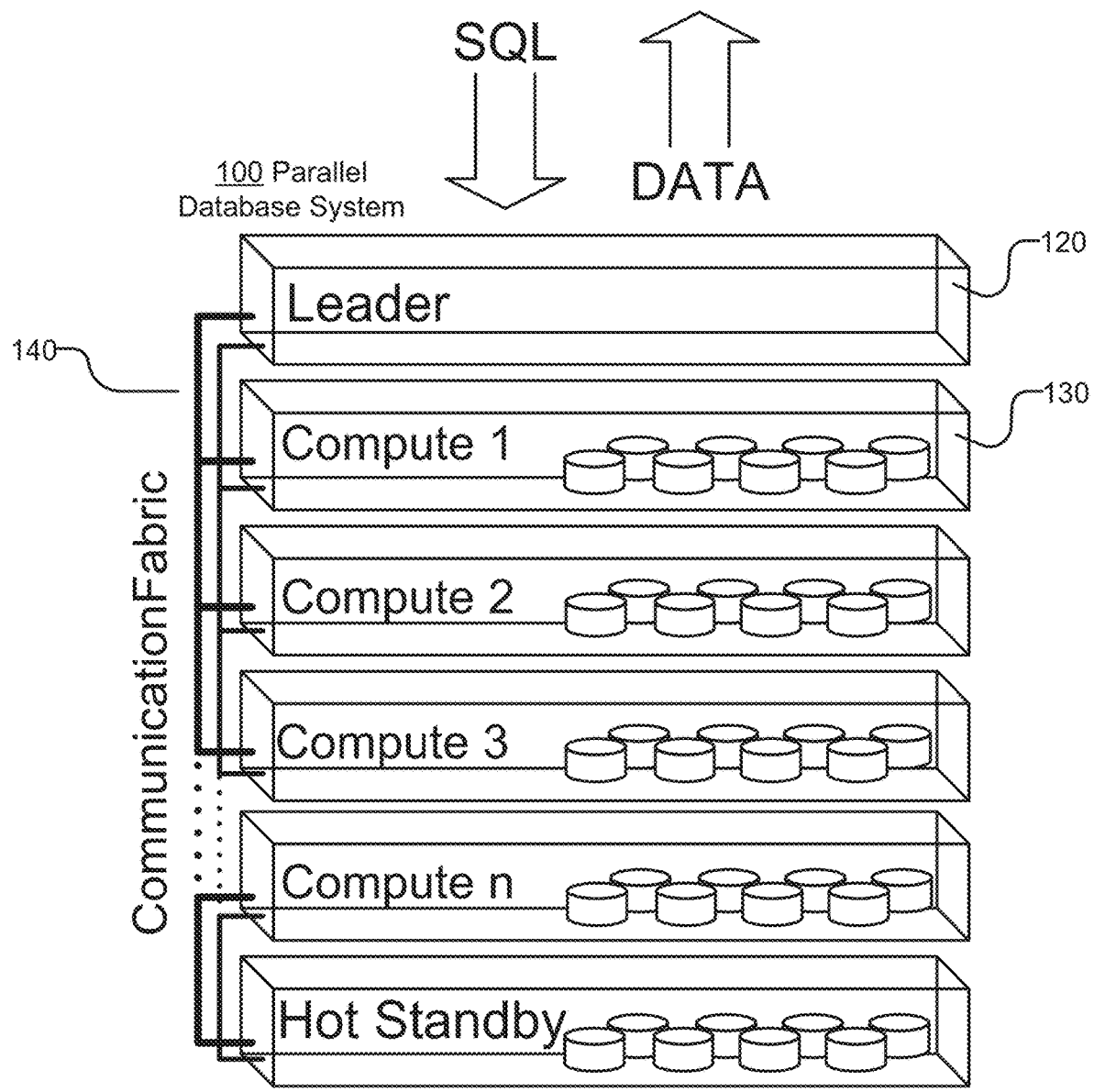
FIG. 1 illustrates the architecture of a parallel database system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Databases allow users to interact with the data stored in the database using a structured query language (SQL) interface. The SQL language allows users to execute SQL statements that can access and manipulate data from the database. The SQL language provides several built-in functions that can be invoked within SQL statements, for example, functions to compute average, maximum or minimum values, mathematical operations, and so on. However, not all functionality needed by a user may be available as built-in functions.

Databases often allow users to customize the database system using other languages, for example, C or C++ by defining user defined functions in those languages and adding them to the system. A user defined function (UDF) allows a user of a database system to customize the database functionality. A UDF is also referred to as a database UDF or a SQL UDF. A user can write new functions and add the new functions to the database system. For example, a user may define a UDF that performs a specialized mathematical operation. The UDF added to the database can be used in SQL statements like other built-in functions of SQL. For example, a database query may invoke the UDF along with other built-in functions of SQL or the database query may compose UDFs with calls to built-in functions. A UDF can be a scalar UDF or a table UDF. A scalar UDF returns a single value (or NULL), whereas a table UDF returns a relation or a table with rows, each row having one or more columns.

A UDF may be written in such a way that a user must invoke the UDF in a particular manner to exploit the underlying architecture appropriately. For example, the performance of the UDF may depend on the manner in which UDF is invoked. For example, the appropriate manner of invoking the UDFs in a SQL statement for a parallel database may be different from the manner in which the statement is invoked for a single processor machine. For example, if a process requires multiple phases, conventional techniques require a user to invoke the UDF, once for each phase and specify distribution of the data for each phase. This requires the end user to understand the details of the implementation of the UDF as well as the details of the parallel architecture.

Embodiments allow UDF writers to write UDFs that encapsulate multi-phase processes. The UDF writer provides the specification of the schema of the data provided as input to each phase and the output of each phase and the partitioning strategy used in each phase. The parallel database system generates efficient code that effectively executes the UDF. As a result, the end user can invoke the multi-phase UDF without being aware of the different phases or how the data is partitioned for each phase.

Embodiments also allow users to specify a global context structure used by UDFs. The parallel database system creates the global context structure based on the user's specification and makes the global context structure available to each compute node of the parallel architecture. Furthermore, the global context structure set up once can be used in multiple executions of the same SQL statement. The global context is also shared among all phases of a multi-phase UDF.

Parallel Database System

FIG. 1 illustrates the architecture of a parallel database system 100, in accordance with an embodiment of the invention. At the highest level, the parallel database system 100 system has four main architectural components: The leader node ("leader") 120, the compute nodes 130, the parallel communication fabric 140, and an optional storage area network (SAN) (not shown in FIG. 1). (A letter after a reference numeral, such as "130*a*," indicates that the text refers specifically to the element having that particular reference numeral, while a reference numeral in the text without a following letter, such as "130," refers to any or all of the elements in the figures bearing that reference numeral.) The leader node 120 controls the execution of the compute nodes, and all nodes communicate with each other via the fabric. For example, leader and compute nodes can be standard x86 servers running Linux. Users and applications may communicate with the system via the leader node 120 by using standard interfaces—ANSI SQL via ODBC/JDBC (in general, "the system" refers to the parallel database system 100 system herein.)

The leader node 120 may be on the network and is intended to interface with external applications and the rest of the computers on a network. The leader node 120 communicates with applications and users via client protocols, including standard ODBC or JDBC, and recognizes ANSI SQL plus database extensions. A leader node 120 is required to manage communication with the compute nodes. The leader node 120 is responsible for controlling sessions, parsing and optimizing queries, and scheduling execution of the workload, but the leader may or may not participate in data operations. Architectural workload separation by node type (leader and compute) allows for better throughput optimization—the leader's bandwidth is optimized for outward communication and handling of query overhead so each compute node's bandwidth is dedicated to data operations.

Compute nodes 130 are the high level component responsible for processing and storing data. Each compute node 130 stores and manages a subset of the rows of each table. For example, if a table has 1 billion rows and there are 20 compute nodes, then about 50 million rows are distributed to each compute node 130. Data may be distributed to a particular compute node based on a hashing algorithm applied to a distribution key, or by round robin. Distribution keys, such as the primary key or other popular join column, are good for even distribution of data, especially when queries will benefit from collocated joins by using the same distribution key. In cases where an inherently balanced distribution key isn't obvious or doesn't exist, round robin distribution may be used to balance the data. By offering multiple methods of data distribution, it is possible to maintain the appropriate balance between data distribution and performance so a parallel database can take best advantage of its resources and provide good parallel efficiency. The parallel database performance is driven by how many compute nodes 130 are present. For example, with most applications, a 50-compute node system may perform almost 5× faster than a 10-compute node system.

Each compute node 130 depends on a set of processes to manage the critical resources of that node. This includes both communication, and secondary storage. In order to achieve maximum parallelism, the system logically partitions data for all tables into multiple subsets per node so that multiple cores can be used to process the data for those tables during queries. These logical partitions are referred to as "slices", and in an embodiment, the number of slices per node is typically configured to correspond to the number of cores per node. Each slice is given a set of query execution processes at system startup, and parallelism is achieved by having the processes of all slices competing for the node's shared resources. Slices communicate with other slices via the communication fabric, but they may not be directly accessed by end user applications. In certain contexts, a slice refers to the portion of data that is allocated to a process (or core) for processing.

In an embodiment, the communication fabric 140 is a high performance fabric based on standard, ubiquitous, 1 or 10 Gigabit Ethernet (GbE) and standard multi-port switches that have full crossbar support. The communication fabric 140 may use a custom protocol to enable highly efficient communication among each of the nodes (leader and compute). It delivers maximum interconnect performance because it is specifically designed for how traffic moves in a complex, parallel database environment (e.g., large intermediate result sets, data redistribution, low rate of packet loss) and therefore uses multiple links simultaneously running multiple data streams. The fabric is implemented internally as multiple independent networks all working on behalf of the database, and while two GbE fabrics may be used for high availability, the parallel database can utilize as many fabrics as are available for increased performance.

System Architecture

Figure 2:
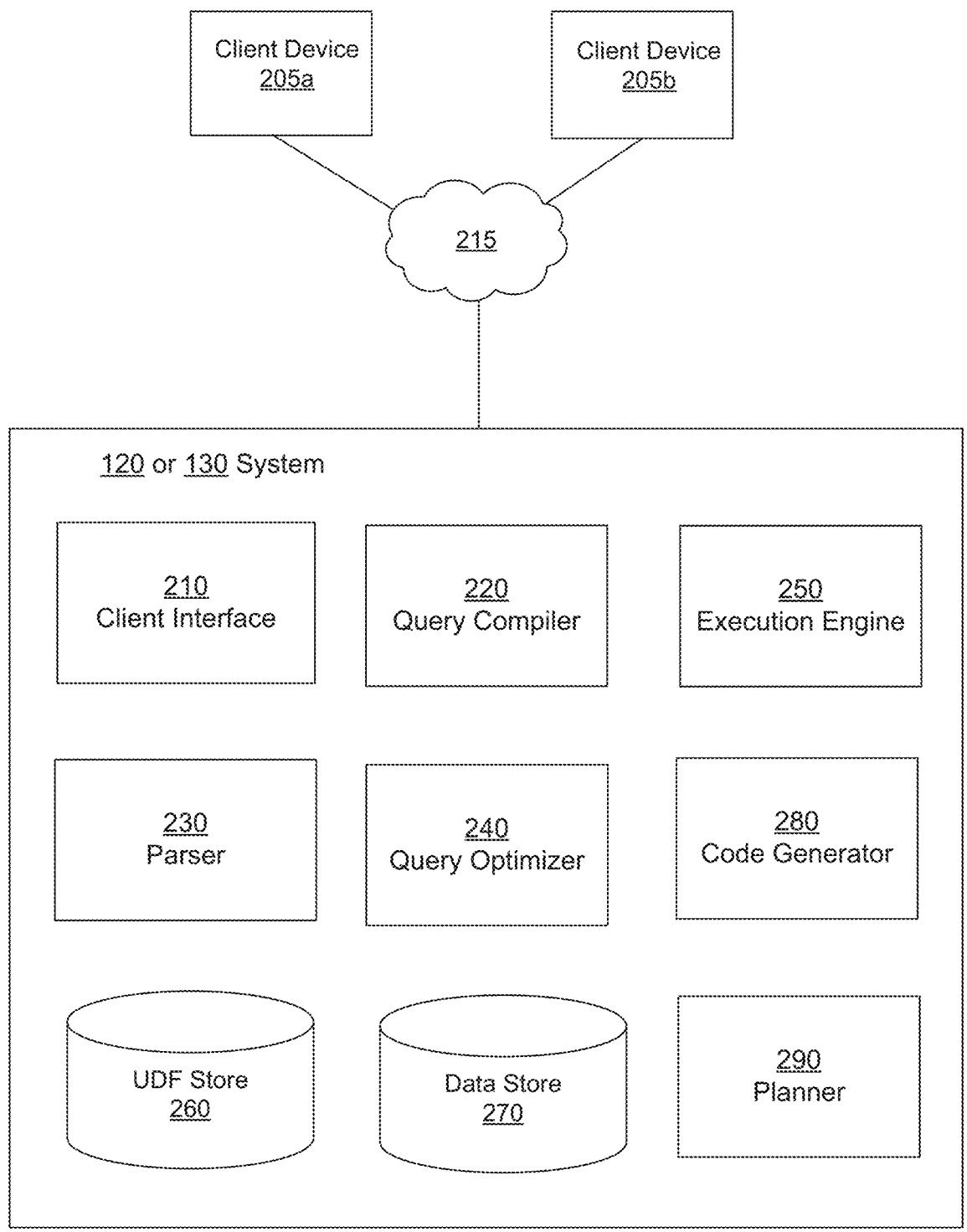
FIG. 2 shows a high level view of internal components and functionality provided by parallel database system, in accordance with an embodiment.

FIG. 2 is a high level block diagram illustrating the system architecture of a node of the parallel database system, for example the leader node or the compute node, in accordance with an embodiment. The compute nodes implement a set of processes running on the node server's operating system that manage communication with the leader node to receive commands and send back data, and route compiled code to individual query processes (for each core or slice on the node) to execute for a given query.

The node 120 or 130 comprises a client interface 210, a query compiler 220, a parser 230, a query optimizer 240, a code generator 280, a UDF store 260, and data store 270. In alternative configurations, different and/or additional modules can be included in the system. The client interface 210 allows a node to interact with client devices 205. Typically the leader node 120 interacts with client devices 205. However compute nodes 130 may interact with external systems, for example, to import or export data. When a new client request comes in to perform a query or some other type of database operation, the system of node 120 spawns a new process to maintain session information for that client. That process is maintained as long as the client session remains open and that client is sending query requests to the leader node.

The query compiler 220 compiles each query to generate a plan for execution of the query and performs any optimizations needed. The parser 230 parses an input query to make sure there are no syntax errors in the query. If a well formed query is provided to the system 120, the parser builds appropriate data structures to perform further processing of the query, for example, query optimization or code generation. The query optimizer 240 performs optimizations to ensure that a query runs fast. The data store 270 stores the data on a persistent storage, for example, a disk. This data includes relations or tables comprising rows and columns of user data. The UDF store 260 stores specifications of UDFs provided by the user. The code generator 280 generates code corresponding to UDFs. The code generated by the code generator 280 is stored in the UDF store 260. The planner 290 generates a query plan for executing a query. The execution engine 250 executes the query, for example by executing a query plan provided by the planner 290.

The following steps detail the high-level operations that take place in processing a client request from its initial creation to sending results or status back to the client, to complete the request. After creating a process to maintain the connection with a new client, system 120 routes the requested operation (a SQL query or some other database operation) through the parser and optimizer to develop a query execution plan to perform or execute the specified query or database operation.

The parser 230 parses any command or query received by the leader node 120. The parser builds a parse tree representation of the query/command that is passed to the optimizer. The optimizer comprises a logical transformation module that performs query rewrite (for optimization purposes) and physical planning module that generates a query plan. The execution engine 250 transforms the query plan into a series of physical operations referred to as an execution plan, and generates code that is sent to the compute nodes for execution.

Each compute node performs all processing of queries with execution of compiled code from the execution plan; sends intermediate results from queries back to leader node for final aggregation. Each compute node may be considered divided into slices, typically one slice per core or processor. Each slice is associated with a portion of data that is processed by the slice. All slices on each node share the server's memory and disk space to parallelize the workload for a query or other database operation sent to all the compute node servers. Each compute node 130 includes a communication layer for communicating, for example, with the leader node and a dispatcher that assigns a particular query task to corresponding slice query processes available to perform queries within each compute node. Each slice can have a pool of separate processes that can independently run compiled query code for a slice of data associated with a query task or other database operation. Additional leader and compute node communication processes handle the transfer of commands and data back and forth between the leader node and compute nodes associated with the execution of specific query tasks.

Client devices 205 are computing devices that execute client software, e.g., a web browser or built-in client application, to interact with the system 120 via a network. Note that the terms "client" or "client device," as used herein may refer to software providing respective functionality, to hardware on which the software executes, or to the entities operating the software and/or hardware, as is apparent from the context in which the terms are used. For example, a client device may execute business intelligence software or analytic tools that send interact with a database system. In one embodiment, the client device 205 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 205 can be any device having computer functionality, such as a personal digital assistant (PDA), mobile telephone, smartphone, etc. In an embodiment, a client of the database system can be another process, for example, a web server that serves queries from remote devices.

The interactions between the client devices 205 and the system 120 are typically performed via a network 215, for example, via the internet. The network 215 enables communications between the client device 205 and the system 120. In one embodiment, the network 215 uses standard communications technologies and/or protocols. Thus, the network 215 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 215 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 215 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 215 can also include links to other networks such as the Internet.

The UDF Framework

Conventional systems allow a UDF writer to specify code that the UDF writer can invoke from a SQL statement. In contrast, embodiments of the invention allow a UDF writer to provide a set of call-back functions. The parallel database system uses the call-back functions to generate efficient code for execution of the UDF. For example, the parallel database system generates efficient data structures to represent the information used in the UDFs and executes the UDF code in an efficient manner to process the rows of an input table. Some of the call-back functions are invoked by the generated code, for example, to perform a clean-up operation after the rows have been processed. The code generation is performed for a specific SQL statement that invokes the UDF. Accordingly, the generated code is optimized for the invocation of the UDF. For example, one invocation of the UDF may be provided a schema as input that is different from the schema provided as input to another invocation of the UDF. The generation of code for each invocation of the UDF allows optimization of the specific invocations based on the schema provided to each invocation.

In an embodiment, the UDF is defined by assuming table type for input and output. The exact definition of input schema are determined when a SQL statement uses the UDF. This allows the UDF to accept different schemas as input table; same UDF can also produce output table with different schemas, depending on input table type and other custom arguments. The following sample UDF illustrates how dynamic binding is achieved in describe phase.

A call-back function provided by a UDF writer specifies code corresponding to a command supported by the UDF framework. The commands supported by the UDF framework include describe, create, finalize, and destroy. A "describe" command is designed for exchanging input and output column schemas between the planner and UDF. Embodiments use the describe interface to complete the schema binding of the UDF for query planning purpose. The input and output schemas for the UDF may not be fully defined at CREATE FUNCTION time. The DESCRIBE interface therefore allows the schema binding for query planning purpose. This allows the UDF to handle different input schemas. This can be considered an example of polymorphism where the same UDF can be executed for different input schemas and produce different output schemas so long as the UDF code and the schemas are compatible. For example, if the UDF code refers to a particular table or column, that particular table or column must be present in the schema. However, different schemas that are used with the UDF can have differences.

Unlike conventional static user defined functions that support a fixed schema, the ability of a UDF to support a describe command allows the schema of the UDF to be determined when the UDF is called (at execution time). Following is an example command to create a UDF that determines a mean value using a two phase process. The first phase computes partial results based on data available at each slice and the second phase takes the partial results and determines the overall mean value.

CREATE FUNCTION mean2phase( )TABLE AS 'table_mean2phase.o' LANGUAGE C;

Following is a sample code for the describe portion of a first phase of a UDF that computes the mean for a given set of values. The following sample code only provides code snippets and not the complete code of the sample UDF.

```
void FirstPhase::describePhase(TableArg &arg, Parameters parameters) {
    //Locally partition the input by the grouping columns
    int numGrpCols=parameters.grpCols.size( )
    for(int grpIdx=0; grpIdx <numGrpCols; grpIdx++)
    {
        int inColIdx=parameters.grpCols[grpIdx];
        arg.addPartitionByColumn(inColIdx);
    }
    //Define the output columns for the partial aggregate
    int sumColIdx=arg.addOutputColumn(TypeFloat8);
    arg.getOutputColumn(sumColIdx)→name.assign
        ("sum");
    int countColIdx=arg.addOutputColumn(TypeBigInt);
    arg.getOutputColumn(countColIdx)→name.assign
        ("count");
    //Output the grouping columns
    for(grpIdx=0; grpIdx <numGrpCols; grpIdx++) {
        int inColIdx=parameters.grpCols[grpIdx];
        arg.copyColumnSchema(inColIdx);
    }
}
```

The above example describePhase function call may be specified as describe command for a particular phase of UDF, for example, a UDF for computing mean value. The first part of the describePhase function specifies the partitioning for the phase using the addPartitionByColumn method. In the above example, each group by column specified in the parameters is used for partitioning. The describePhase function further specifies the output columns of this phase of the UDF. Two columns are defined as the output of this phase, a "sum" and a "count" column. Each phase can have a different set of output columns. The output of a phase becomes the input for the next phase of the UDF. The describePhase function also specifies the grouping columns.

The following sample code specifies the describe portion for the second phase of the two phase mean computation.

```
void SecondPhase::describePhase(TableArg &arg) {
    int numInCols=arg.getInputCount( )
    //Globally partition input by the grouping columns
    for(int inColIdx=2; inColIdx <numInCols; inColIdx++) {
        arg.addPartitionByColumn(inColIdx);
    }
    //Output the mean value
    int sumColIdx=arg.addOutputColumn(TypeFloat8);
    arg.getOutputColumn(sumColIdx)→name.assign
        ("mean");
    //Output the grouping columns
    if(numInCols>2) arg.copyRightColumnSchema(2);
}
```

The describe portion of the second phase also specifies the partitioning information for the phase using the addPartitionByColumn call. The output for this phase includes a single column corresponding to the "mean" value computed. The above function also specifies the grouping columns. An overall describe function that invokes the above two describe functions is specified for the UDF. The above sample code illustrates how the describe function can specify specific details for each phase of the UDF. The partitioning information and schema of the output of each phase can be specified based on the input parameters. The input parameters for the overall UDF are determined by the code generator by executing a system command that determines the schema of the input. For example, if the input of the UDF being invoked is "SELECT * from table T1," the code generator may execute a "describe" system command using the select statement to determine the columns returned by the statement. These columns form the input to the UDF being invoked which in turn determines the schema and partitioning information for each phase of the UDF. It is possible that during a particular invocation using the above select statement, the table T1 has a given set of columns but the set of columns during a subsequent invocation is different, for example, if the user alters the table. However, the second invocation is optimized for the schema corresponding to the table T1 at the time the UDF is invoked. Accordingly the UDF execution is optimized for each invocation.

The UDF writer also provides a process method for each phase that specifies the computation corresponding to the phase. The first phase of the mean function determines the partial results based on sum of a subset of the input values.

```
void FirstPhase::process(TableArg &arg, RowDesc
    *rd_in) {
    if(m_row_out==NULL)    m_row_out=FirstPhase::
        newRow(arg, rd_in);
    float8_t rdVal=rd_in→getValueAsFloat8(m_meanColIdx);
    m_accumulator+=rdVal;
    m_rowCount++;
}
```

The process function for the second phase of the mean computation is provides the partial results computed by the first phase as input. The process function for the second phase determines the sums of the partial results computed by the first phase.

```
void SecondPhase::process(TableArg &arg, RowDesc
    *rd_in) {
    if(m_row_out==NULL)    m_row_out=SecondPhase::
        newRow(arg, rd_in);
    float8_t rdVal=rd_in→getValueAsFloat8(0);
    bigint_t rdCountVal=rd_in→getValueAsBigInt(1);
    m_accumulator+=rdVal;
    m_rowCount+=rdCountVal;
}
```

Other commands supported by the UDF framework include, create, finalize, and destroy. These commands are invoked at compute nodes to manage the lifecycle of UDF. For example, the UDF returns a TableFunction instance for each CREATE command requested by the parallel database system 100. The FINALIZE command notifies UDF that there are no more input rows for the corresponding TableFunction instance. The FINALIZE command provides the last chance for a UDF to emit remaining output rows. The DESTROY command notifies the system that the UDF is no longer needed. As part of the DESTROY command, the UDF may delete the TableFunction instance created during the CREATE command as well any other applicable resource cleanup. At the end of the UDF processing at each node a message is communicated by the compute node to the leader node indicating that the compute node has finished the processing for the UDF.

Another example SQL statement for defining the UDF is as follows:

CREATE FUNCTION MyTableUDF LANGUAGE 'C' TABLE AS "/tmp/tbludf.so";

This table function takes 2N input columns and produces N output columns. The value of an output column is a function of sum of two input columns with a fudge factor defined as follows:

OutCol[i]=fudge_factor*(InCol[2i]+InCol[2i+1]) where 0<fudge_factor<1.

The describe function in this example performs various steps. The describe function validates the input schema, verifies that the input has 2N columns, verifies that all input column types are supported. The describe function throws error if any of the validation steps fail. The describe function verifies partition or order by requirements if present and necessary. The describe function validates additional arguments if required by UDF, for example, the above example UDF uses a custom argument "FudgeFactor", which ranges between 0 and 1. The describe function construct output schema, for example, in the above sample UDF, the describe function creates N output columns with integer type.

The following are examples of SQL statements that call the above example UDF. These examples assume three tables, T1 with two integer columns a1 and b1, T2 with two integer columns a2 and b2, and T3 with one integer column a3. In this example, MyTableUDF completes the DESCRIBE request by returning one column as output schema.

SELECT * FROM MyTableUDF(ON ((SELECT T1.* FROM T1) FudgeFactor(0.5)));

Another example of SQL statement calling MyTableUDF is as follows. In this example, MyTableUDF completes the DESCRIBE request by returning two columns as output schema.

```
SELECT * FROM MyTableUDF(ON
    ((SELECT T1.*, T2.* FROM T1, T2 WHERE a1=a2
        and b1=b2) FudgeFactor(0.4)
    ));
```

Another example of SQL statement calling MyTableUDF is as follows. In this example, MyTableUDF reports an error as the result of DESCRIBE due to incorrect number of input columns.

```
SELECT * FROM MyTableUDF(ON (
    (SELECT T1.*, T2.*, T3.* FROM T1, T2 WHERE
        a1=a2 and b1=b2 and a1=a3)
    ));
```

User Defined Function Life Cycle

Figure 3:
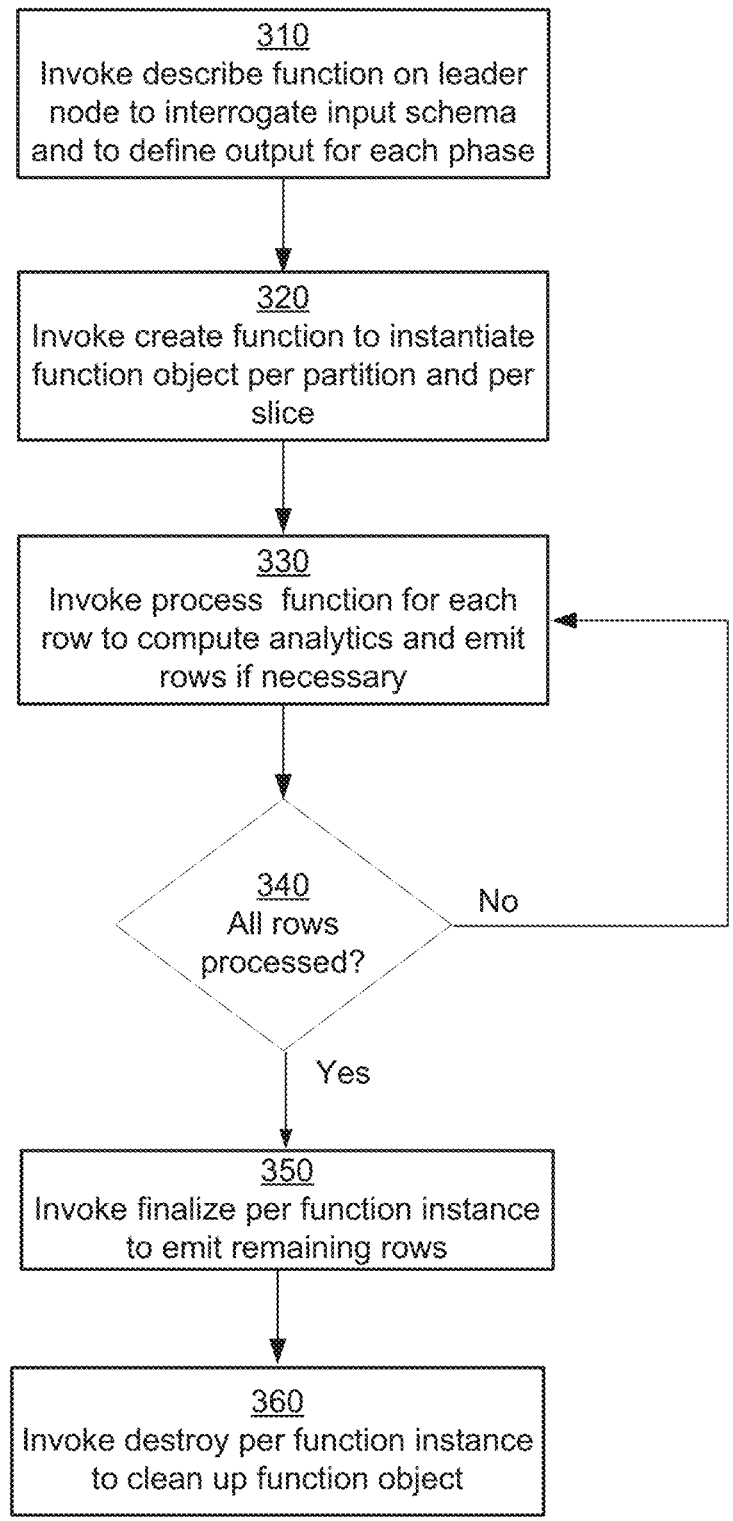
FIG. 3 describes a flowchart for illustrating the the life cycle of a UDF, in accordance with an embodiment.

FIG. 3 illustrates the life cycle of a UDF in accordance with an embodiment of the invention. The execution engine 290 invokes 310 the describe function of a UDF on a leader node. In an embodiment, the describe function is invoked 310 during a query planning phase. The describe function interrogates the input schema and named parameters of the UDF. In case of multi-phase UDFs, it defines output, partitioning, and partition ordering. The output for each phase may include the input columns, new columns, and named parameters.

The execution engine invokes 320 the create function per function instance. In an embodiment, there can be one function instance per partition and per slice. The create function instantiates a function object. The execution engine 290 invokes 330 the process function for each input row. Execution of the process function results is computation of analytics and may result in emitting of rows. The process function is invoked 330 per row while rows are available 340. The execution engine 290 invokes 340 the finalize function per function instance. The finalize function computes analytics and provides the last opportunity to emit rows before the execution of the UDF is completed. The execution engine 290 finally invokes 350 the destroy function that is invoked once per function instance. The destroy function performs clean up and destroys the function objects created.

Figure 4:
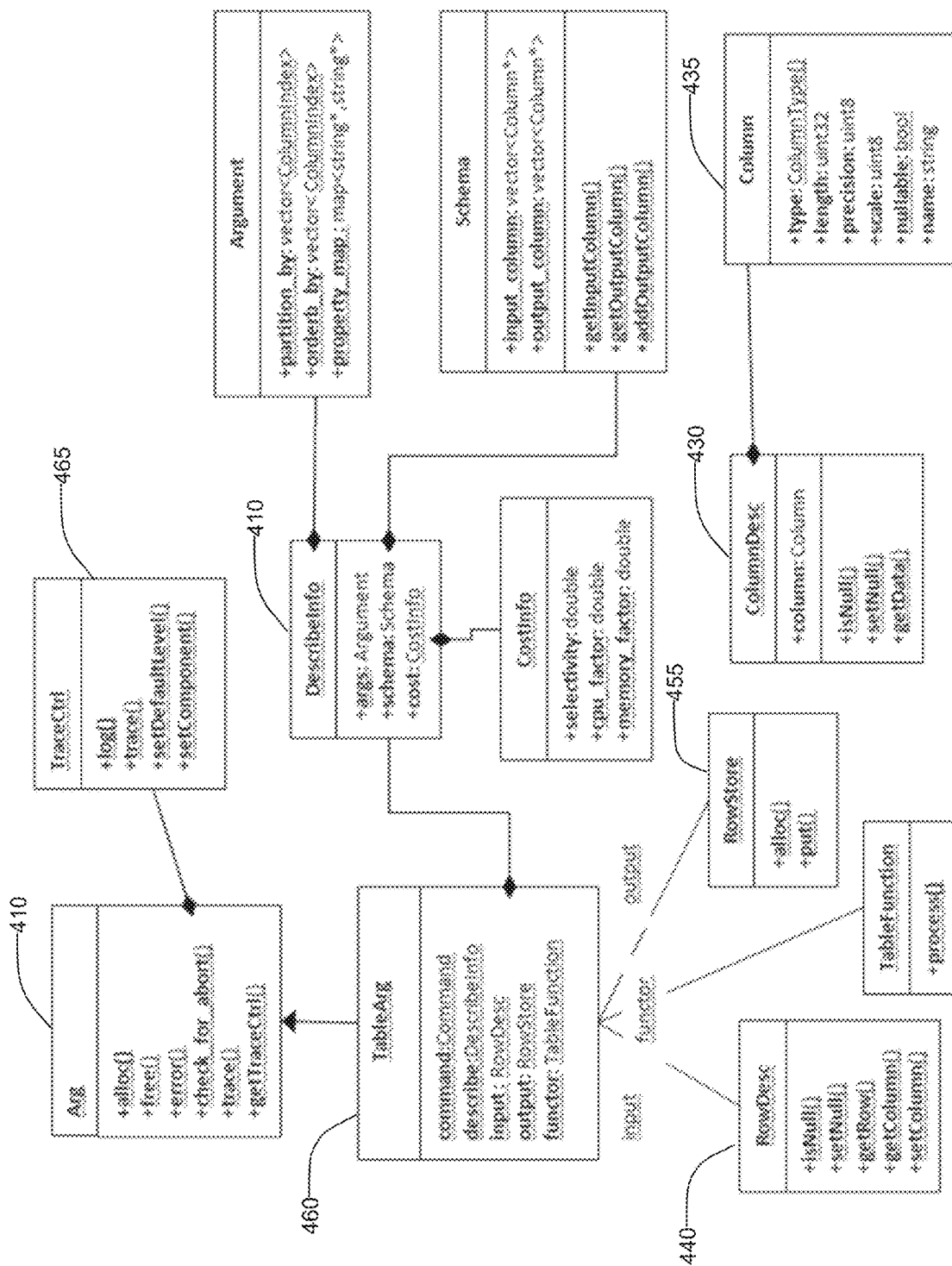
FIG. 4 describes the structure of the various types of objects used for defining a UDF, in accordance with an embodiment.

FIG. 4 describes the class structure corresponding to the various types of objects used for defining a UDF. The methods based on a naming convention getX and setX specify the code for getting/setting an object of type X. For example, getColumn and setColumn perform getting/setting of a column. The method isNull checks whether a value is null and setNull sets a value to null. Arg 410 is a class that defined an argument. The TableArg 460 class inherits from Arg and specifies a table argument. The TableArg 460 argument is associated with a DescribeInfo 410 object. RowDesc 440 is a row descriptor for specifying a row. The DescribeInfo 410 object is associated with an argument object that specifies how to partition and order based on an argument and a schema object that specifies the input columns and output columns (e.g., for each phase) and methods to get input column, set output column and add output column (to a phase). A TraceCtrl 465 object allows tracing of information in the UDF. The input to a phase is specified using a RowDesc 440 object and the output is represented as a RowStore 445. A TableFunction 445 class specifies the process function that performs the processing of the UDF for each row. A ColumnDesc 430 and Column 435 objects specify a column.

The code generator 280 generates objects for storing information specific to the UDF and also to a particular invocation of the UDF. For example, if a UDF is invoked by providing a SQL query that generates three columns, the input structures for the UDF are generated based on a DESCRIBE executed to determine the schema of the input SQL query). The C/C++ structures generated for representing the input to the SQL UDF. The generated structures are optimized for storage in memory, for example, by adding appropriate padding bytes. The padding bytes optimize the generated code by providing alignment for CPU and memory access to avoid alignment fault.

The generated code can also perform optimizations for execution of the various phases of a UDF. For example, the generated code can start execution of the next phase for a row if it determines that all the information necessary for executing the next phase is available, aka "pipelining." Accordingly the generated code does not need to wait for the execution of all the rows of the current phase to finish before the execution of the next phase is started. As a result, the output values may start generating before all the input rows are processed or even read from the disk. The generated code is compiled and executed as part of the server code. As a result the generate code acts as an extension of the database server. This allows users to customize the database and obtain high efficiency for the new code added for customization.

Figure 5:
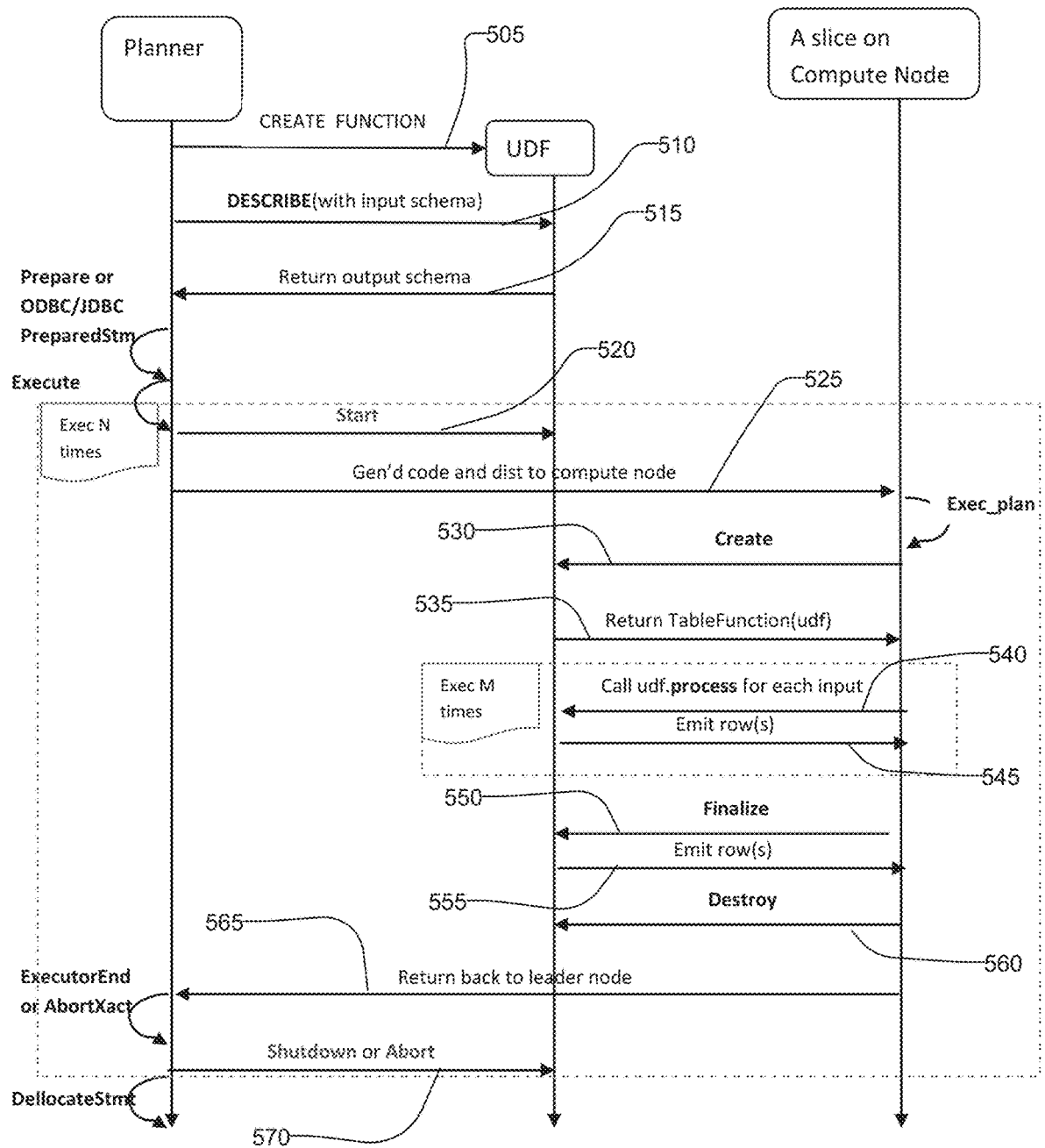
FIG. 5 shows an interaction diagram illustrating the overall flow of execution of a UDF, in accordance with an embodiment.

FIG. 5 illustrates the overall flow of execution of a UDF, in accordance with an embodiment. The planner 290 invokes 505 the "create function" command that creates a UDF object encapsulating the data structures required for processing the UDF. The planner 290 further invokes 510 the "describe" command of the UDF. The describe command provides information describing the input schema for the invocation of the UDF to the UDF object. The UDF object provides 515 the output schema for the UDF based on the input schema for the invocation of the UDF to the planner 290. At this stage the planner 290 has the information describing the output schema for the UDF. If a prepared statement is used for the query invoking the UDF, the start, shutdown and abort commands are invoked (520, 565, and 570 respectively) are invoked N times if the prepared statement is executed N times.

As illustrated in the sequence in FIG. 5, the commands start, shutdown, and abort are invoked at leader node. Specifically, the command start is called when query is planned and ready for execution. At the return from the last step of query execution, the planner notifies UDF with shutdown command. For any transaction abort, such as user cancel or execution error, the planner notifies the UDF by abort command. For repeating executions of the same prepared statements, either by SQL prepare statement or ODBC/JDBC messages, there are multiple start-shutdown or start-abort commands for corresponding SQL execute statements.

During invocation of start command, the UDF code can initialize a session object associated with a global context data structure. The global context structure may represent a mapping from possible value of a column of a table to another set of values. For example, a column of a table may store articles sold by a business. The mapping data structure can map each article to category of articles (for example, for analytic purposes). Alternatively, a column of a table may store a name of a city and the mapping structure may map each name of city to a county (or a state).

In an embodiment, during the invocation of the start method, the UDF code may invoke database queries to retrieve information used for setting up the global context data structure. The SQLClient interface described herein allows database queries to be dynamically invoked from the UDF code. For example, the information defining the mapping structure may be stored in a database table and the start method may execute a SELECT statement that obtains the mapping information from the database. In an embodiment, the invocation of database queries within the UDF code is allowed by the start method that is invoked by the leader node but not by methods invoked by each compute node, for example, create, process, finalize, and destroy. Invoking database queries by each compute node may result in slow performance of the overall query. Therefore, any information that needs to be loaded from the database is obtained by the leader node and distributed to the compute nodes. Note that conventional database system do not allow UDFs to invoke database queries for performance reasons. The UDF may be invoked for each row of an input table and conventional databases disallow invoking another database query for each input row being processed. If the databases allowed invocation of the database query in the UDF, the performance of the overall query may be slow. Embodiments therefore allow a global context structure, for example, a mapping table based on a dictionary to be made available at each compute node efficiently.

The leader node generates code based on the UDF (that corresponds to the plan generated by the planner) and distributes 525 it to each compute node along with the session object (and associated data structure). Each compute node executes the plan corresponding to each slice on the compute node. Each compute node invokes 530 a create function for a slice that returns 535 a function object storing the describing the UDF. The compute node executes 540 the "process" method of the UDF for each input. The UDF code may emit 545 rows for each invocation of the "process" method. Once all inputs are processed, the compute node invokes 550 the finalize method and the UDF code emits 555 any remaining rows. The compute node invokes 560 the destroy method of the UDF for the slice. Each compute node informs 565 the leader node of the completion of the UDF processing for the slice. The leader node may invoke 570 a shutdown or the abort command of the UDF (as necessary.) The leader node may also perform any cleanup necessary, for example, by deallocating any memory that was allocated.

Multi-Phase UDFs

Multiphase table functions are user defined functions that define multiple function lifecycles in a single function definition. Multiple phases are useful for many applications, for example, two-phase grouped aggregation, regression analysis, and any analytic process requiring multiple phases such as in most MAPREDUCE applications. Typical MAPREDUCE applications include a map phase that divides the input into smaller sets and distributes the set among multiple processors. Each processor performs some processing and the reduce step collects the answers from individual processors and may combine them in certain way. Several types of problems can be solved using MAPREDUCE paradigm, for example, distributed sorting, web-link graph processing, clustering. The decision regarding the number of phases of the UDF can be made at runtime. In other words the UDF can determine the number of phases of the UDF based on a user input, for example, a named parameter, or result of SQL queries dynamically executed, for example, by using the SQLClient interface described herein, or session information from external data source.

Multiple phases may be used in processes that perform data re-partitioning or re-ordering. For example, a first phase of computation may be performed with a particular type of data partitioning strategy and a second phase of the computation may be performed using another data partitioning strategy. Conventional UDF implementations allow user to specify PARTITION BY and ORDER BY clauses that are used for partitioning. However, to be able to repartition data within the same process, the end user has to invoke the UDF multiple times, once for each type of partition desired. Following is a processing of a query using conventional techniques:

SELECT * FROM tUDF(ON t1 PARTITION BY a1 ORDER BY c1 WITH npa(1) npb(b1));

The PARTITION BY clause is a logical specification about processing the input data in groups but implies physical distribution. ORDER BY clause specifies order of input within each partition. The SQL user determines the partitioning strategy when invoking the UDF through SQL statements. The partitioning of data can affect the performance of a UDF significantly. Typically, the end user of SQL may not be an expert in utilizing the underlying architecture of a parallel machine executing the queries. Besides the end user of SQL may not understand the details of the processing within the UDF. This is so because the end users of the UDF may prefer to treat the UDF as a black box and understand the UDF at a functional level rather than how the UDF implements the underlying functionality. For example, if a UDF orders a set of data in a particular order, the end user of SQL may invoke the UDF wherever the end user desires the particular ordering. However, the UDF implementation may use one of several algorithms available for determining the order of the set the set of data. The end user of SQL is unlikely to know the details of the UDF implementation. The partitioning strategy may depend significantly The person developing the UDF, i.e., the UDF writer is more likely to understand the architecture of the parallel machine and how to best partition the data for the UDF Therefore, embodiments allow the UDF specification to specify partitioning in the UDF code rather than through the SQL interface for invoking the UDF. Therefore, these embodiments obviate the need for SQL PARTITION BY and ORDER BY syntax.

Embodiments add support for partitioning data locally on each slice, removing the need for the UDF writer to manage multiple data groups within a UDF, for example, in the first phase of two-phase aggregation.

Following is a comparison of an example two-phase process implemented as a UDF using conventional techniques with embodiments of the invention. The example illustrates a mean2phase UDF that has two phases. Using conventional techniques, the mean2phase UDF may be invoked from a SQL statement as follows.

SELECT * FROM mean2phase(
   ON mean2phase(ON t1 aggcol(a1) grpcol(b1)) PARTITION BY b1);

The SQL statements uses a1 and b1 columns of a table. The PARTITION BY clause specifies b1 column for portioning. The aggcol(a1) clause specifies a1 as the column for aggregating, and grpcol(b1) clause specifies b1 as the column for grouping by. The first phase groups on each slice and generates partial results and the second phase redistributes data by grouping values and generates final answers. As shown in the above SQL statement, the end user of SQL needs to invoke the mean2phase call twice, once for each phase. The end user also needs to specify the partitioning used by each phase. Furthermore, this sample UDF supports a single grouping column. But handling an arbitrary number of grouping columns of mixed data type would be complex and place significant burden on the end user.

Embodiments allow a syntax for calling the UDFs without the end user specifying a PARTITION BY or ORDER BY clause. The input to the UDF is the source of input, for example, the input to the UDF may be an output of a SELECT statement. The UDF writer uses the DESCRIBE function of the UDF to specify partitioning/grouping and sorting for the various phases of the UDF. In an example of a UDF having a single phase, the end user of SQL may use the following SQL statement to invoke the UDF.

SELECT * FROM (ON t1 WITH grpcol(a1) seqcol(b1) npa(a1) npb(b1));

In the above SQL statement, the UDF called tUDF is invoked on table t1. The group by column a1 is specified using grpcol(a1), a sequence column b1 is specified using seqcol(b1) and two named parameter columns a1 and b1 are specified using npa(a1) and npb(b1). The describe function provided by the UDF writer specifies that tUDF has a single phase that returns a specific output schema and whose input will be partitioned by (and distributed on) column a1 and sorted on b1 within the partition.

The two phase mean2phase example described above can be implemented using embodiments of the invention and invoked using the following SQL statement.

SELECT * FROM mean2phase(ON t1 WITH aggcol(a1) grpcol(b1));

Accordingly, the end user of the UDF needs to invoke the UDF only once, although there are two phases of the UDF. In this case, the describe function specifies that there are two-phases. The describe function further specifies that phase one partitions by b1 but does not distribute. The output of phase 1 is the sum of the partition, the count of the partition, and the grouping column value. Phase two takes this input schema and specifies that the input be partitioned and distributed on the grouping column and returns the output schema of average of the partition and the grouping column.

The planner enforces distribution and ordering per phase. For example, assume that the SQL statement that invokes the mean2phase UDF is as follows.

SELECT * FROM mean2phase (
        ON sales WITH AGGCOL (qtysold) GRPCOL(sellerid));

The query plan generated for the above SQL statement is as follows, according to an embodiment.

XN Table Function mean2phase phase 2
        →XN Sort, Sort Key: sellerid
        →XN Network Distribute
        →XN Table Function mean2phase phase 1
        →XN Sort, Sort Key: sellerid
        →XN Seq Scan on Sales The above query plan includes operators for each phase, i.e., operators "XN Table Function mean2phase phase 1" and "XN Table Function mean2phase phase 2." The input to each phase is sorted using the sort key sellerid as specified by the operator "XN Sort, Sort Key: sellerid" applied to each phase. After the completion of phase 1, the data is distributed for phase 2 using the operator "XN Network Distribute."

In general the input to the describe function is the source schema and the named parameters that are used by the UDF. The describe function provides an ordered vector of information for each phase of the multiphase UDF. The information for each phase may include the following information (1) output schema of the phase, Logical partitioning of its input (specified by input column indices). (2) Flag for local or global processing. Global processing may cause redistribution by partition or collecting all rows on a single slice if no partitioning was specified. Local processing may leave redistribution up to the default strategies of the parallel database system. In an embodiment, the rows may be left on whatever slice they occupied or use round robin or other redistribution strategy to spread out the work. (3) Ordering of its input specified using column indices and ascending/descending flags. The UDF need only specify the desired ordering within the partition. (4) Named parameters applicable to the phase. Embodiments may assume the original list of named parameters to be applicable to each phase.

The input to the first phase is the ON clause. Input to subsequent phases is the output of the previous phase, suitably partitioned, ordered, and distributed. Output of the last phase is the input to the rest of the query. In an embodiment, the UDF writer may specify for a phase, partition or order by an expression rather than a column.

The input to the UDF could be specified using a table name, for example using the syntax "... UDF (ON table)." The input to the UDF can be a SELECT statement, for example using the syntax "... UDF (ON (SELECT * FROM TABLE))." The input to the UDF can be the result of another UDF, for example using the syntax "... UDF (ON UDF (ON table))." The input to the UDF can be a constant parameter, for example using the syntax "... UDF (ON table WITH parameter (constant))." The input to the UDF can be an expression based on column values, for example using the syntax "... UDF (ON table WITH parameter (a1*b1))."

To summarize, embodiments allow a UDF writers to specify a single UDF having multiple phases, each phase performing a different computation based on a different partitioning with respect to other phases. The UDF may have named parameters as input. A multi-phase UDF specifies a describe function that specifies the inputs and outputs of various phases. The describe function may also specify partitioning for each phase. The output of a phase is provided as input to the next phase. The output of each phase may have different number of columns compared to the input for the phase. The UDF include a process function that specifies the analytic computation to be performed for each input row. The process function of the UDF may emits rows. Accordingly, the UDF is executed by each compute node for a set of rows corresponding to the slice assigned to the compute node and may emit a set of output rows. Other functions specified by the UDF include a create function that instantiates a function object storing information describing the function. The function object may be created per partition and per slice. The UDF may also include a finalize function that may emit rows after all input rows are processed. The UDF may also include a destroy function that cleans up and destroys the function object. The planner receives the UDF specification and generates code for efficient execution of the UDF. The code generator invokes the describe function to determine the input/output information and partitioning information for each phase. The code generator also analyzes the database query invoking the UDF to determine the schema corresponding to the input of the UDF. The code generator uses this information to generate efficient code for executing the UDF. In an embodiment, the UDF writer can specify cost information associated with each phase. The planner inspects the cost information and uses it for generating an optimized query plan. Accordingly, the planner may treat each phase of the UDF as a separate operator of the query and may introduce additional operators between the operators corresponding to the phases if necessary for generating an optimal query plan. The generated code includes data structures that are specifically generated for storing information used by the UDF and are not generic data structures used for storing arbitrary information. Accordingly, the data structures generated use variables that are specific to the UDF invocation, type information of variables specific to the UDF invocation, and may include padding bytes to avoid alignment faults. The generated code also pipelines (or streams) the execution of multiple phases. Accordingly, the processing for a second phase for a row can begin before all rows assigned to the compute nodes finish processing the first phase (assuming the first phase needs to be executed before the second phase as per the UDF specification.)

Code Generation for UDFs

The code generator 280 generates code based on the UDF specification provided by the user. In an embodiment, the code generator 280 executes the describe function specified by the UDF writer as part of the UDF specification. The code generator 280 processes the information available in the data structures built by the UDF writer using the describe function. For example, the code generator 280 determines the signatures of the various phases of the UDF including the inputs and outputs of each phase. The code generator 280 generates optimized code so that the UDF can be executed efficiently.

In an embodiment, the code generator 280 generates structures and objects specific to the UDF for storing information used for executing the UDF. The structures and objects may be generated specifically for a particular invocation of the UDF, so that they are customized for efficient execution for that particular invocation of the UDF. For example, if a UDF is invoked by providing a SQL query that generates three columns, the code generator 280 executes a system command to determine the schema of the input SQL query and generates input structures based on the values of the three columns. The code generator 280 generates structures that are optimized for storage in memory, for example, by adding appropriate padding bytes. The padding bytes provide alignment for CPU (memory access) optimization to avoid alignment fault. This optimization allows use of specific data structures for each invocation of the UDF instead of using generic data structures. An example of a generic data structure is a data structure that uses a mapping table for mapping variable names to values so that arbitrary number of attributes can be specified in the structure. Furthermore, a generic data structure is implemented without assuming any types of the variable. Accordingly, each variable stored in the data structure may store additional information, for example, to specify the type of the variable. Since generic structures require additional storage space and additional levels of indirection in accessing the variable values, these structures are inefficient. In contrast, the code generator 280 determines the number of variables and type of each variable used in the UDF and generates specific structures optimized for the given set of variables.

The following is an example of a generated structure used for specifying input to the UDF. The record is optimized, for example, by adding padding bytes pad_to_32[7] to generate the structure of optimized size specific to the UDF. The attributes f0, f1, and f2, correspond to the various column values. Each variable in the structure has a type matching the type of the input variables. Furthermore, the pad_to_32[7] variable is added for providing alignment for CPU (memory access) optimization to avoid alignment fault.

```
struct udf_in_rec2 {
    double f0;
    int64 f1;
    int64 f2;
    uint8 nulls[1];
    uint8 pad_to_32[7];
};
```

Other optimizations are performed for example, optimizations to reduce the size of the C++ virtual function tables.

For example, since the types of various variables are known, the various dynamic invocations of virtual functions can be determined. As a result, the virtual function table can be optimized so that it eliminates signatures of function invocations that are never going to be performed by the UDF.

Other code optimizations performed by the code generator 280 include optimization to avoid unnecessary branches of control statements, such as a switch statement in getColumn function that gets a value of a column. Since the possible types of columns used in the UDF can be determined from the information provided by the user in the describe function of the UDF, the code generator 280 can generate optimized code so that unnecessary branches for types that are not used in the UDF are eliminated from the switch statement. The following getColumn function is an example of generated code for an instance of udf_in_rec2 structure shown above.

```
void *getColumn(int i) {
    switch(i) {
        case 0: return &rec_udf_in2→f0; break;
        case 1: return &rec_udf_in2→f1; break;
        case 2: return &rec_udf_in2→f2; break;
    }
    return NULL;
}
```

The code generator 280 may generate optimized code for a comparator function that compares records for purposes of sorting. For example, if the results of the UDF or data processed by phases is sorted based on a set of keys corresponding to columns, the code generator 280 generates a comparator for the specific types corresponding to the sort keys. The following example code shows a compare function that declares a structures scan_rec0 with the types specific to the UDF and generates code specific to these types for comparing two records of the scan_rec0 structure. In this example, the sorting is performed using the column corresponding to the attribute f2 of the structure scan_rec0.

```
static int compare(const void* pp1, const void* pp2) {
    struct scan_rec0 {
        double f0;
        int64 f1;
        int64 f2;
        uint8 nulls[1];
        uint8 pad_to_32[7];
    };
    scan_rec0* p1=*((scan_rec0**)pp1);
    scan_rec0* p2=*((scan_rec0**)pp2);
    return (((p1→f2)>(p2→f2))? 1: (((p1→f2)<(p2→f2))
        ?-1: 0));
}
```

The generated code can also generate optimized code for execution of various phases. For example, the generated code can start execution of the next phase for a row if it determines that all the information necessary for executing the next phase is available. This can be considered pipelining of the execution of various phases. Accordingly the generated code does not wait for execution of all the rows of the current phase to finish before the execution of the next phase is started. The execution of the next phase can start as soon as resources and the required data is available to start executing the phase. The output values may start generating before all the input rows are processed or even read from the disk.

In some embodiments, the generated code of the multiple phases is processed in the same loop that iterates over various rows. The intermediate results between phases can be stored as stack variables within the loop. This allows the generated code to take advantage of the potential pipeline parallelism optimized by a C++ compiler. In an embodiment, the code generator 280 generates code that pipelines computation across multiple invocations of UDFs. For example, is the same SQL statement includes a nested call to two UDFs such that the output of a first UDF is passed as input to a second UDF. The code generator generates code that allows execution of the second UDF before finishing the execution of the first UDF. For example, a compute node can start processing the second UDF as soon as the processing of the first UDF is completed for a given row without having to process all the rows for the first UDF.

In an embodiment, the UDF writer can specify cost information associated with each phase. The planner inspects the cost information and uses it for generating an optimized query plan. The cost information may be specified by the UDF by populating a structure. The cost information includes selectivity and cost of row processing for a particular invocation of the table UDF and may include the following information among other type of information. (1). (2) The number of rows returned per input row. (3) The CPU usage per row measured in number of flops (floating point operations per second). (4) The CPU overhead for the UDF invocation measured in number of flops (floating point operations per second). (5) The memory footprint of the UDF measured in kilobytes. All this information is used by the planner to generate an optimal query plan.

The generated code is compiled and executed as part of the server code. As a result the generated code acts as an extension of the database server. This allows users to customize the database and be able to use features or functionality provided the new code in the same manner as the user uses built-in functionality of the database.

Global Context

A global context is a data structure created by UDF and accessible to UDF in its entire lifecycle. The global context is also referred to as a session context. The global context is propagated from leader node to compute node over wire. Accordingly, the same global context is available through all phases of the same UDF. The scope of global context is limited by its originating UDF.

A global context may be used in a UDF for various purposes. As an example, a UDF that transforms a value from one format to another may use a mapping table. For example, a UDF that transforms street addresses may use a mapping table from cities to states, or a mapping table from zip codes to cities and states. A UDF that performs certain domain specific transformation may use a mapping table or any data structure comprising domain specific information. The global context structure may be used for both scalar UDFs and table UDFs. The global context structure may be built using information stored in the database. The global context structure may be built using a set of rows from a table stored in the database. The global context structure may also be built using information stored in a file. The global context structure may also be built using information obtained from an external source. For example, if the database is processing data obtained from an external source, the external source may provide information to define the global context for processing the data. The ability to read global context information from the database or any external source allows the UDF to be more flexible. Accordingly, the transformations performed by the UDF are not fixed in the code of the UDF. Instead the transformations depend on information read by the UDF code and can be changed without having to recompile the UDF code. Accordingly, the global context information may change for each invocation of the UDF.

Following is a use case for global context. A put( ) UDF takes an input value and format parameters, returning the value formatted based on the format parameter. Using a global context, a "select" statement returning value/format rows from a look up table may be specified as a global context query when creating/installing the put( ) function. Any query utilizing the put( ) UDF would also need to execute any global context queries defined for that UDF. The results of the global context queries are made available to the UDF during its execution.

Global context is created and modified by UDF at session commands: start, shutdown, or abort. In an embodiment, global context is not shared by other UDF instances in the same query. For example, two global contexts may be created for u1 and u2 for following query: "SELECT * FROM MyUDF (on t1) as u1, MyUDF(on t1) as u2." The two invocations u1 and u2 could correspond to different tables input to the corresponding call to MyUDF. Therefore, the two calls do not share a global context since the information corresponding to the two invocations can be unrelated to each other. In an embodiment, global context is defined and implemented in a programming language, for example, C++.

In an embodiment, a global context supports named parameter interface. For example, UDF writer can programmatically add a named parameter at DESCRIBE command, says npSessionContext('foo'), which will be available at subsequent commands and accessible through existing named parameter setter and getter functions. An alternative to named parameters is C++ object serialization. In these embodiments, the global context comprises a data structure that is accessed via an object interface. UDF session objects at front-end may be managed by a global context manager and a list of memory contexts as parent references (The global context acts as a monitor for all session objects to keep track of the lifecycles of their parent references/MemoryContext(s).)

Figure 6:
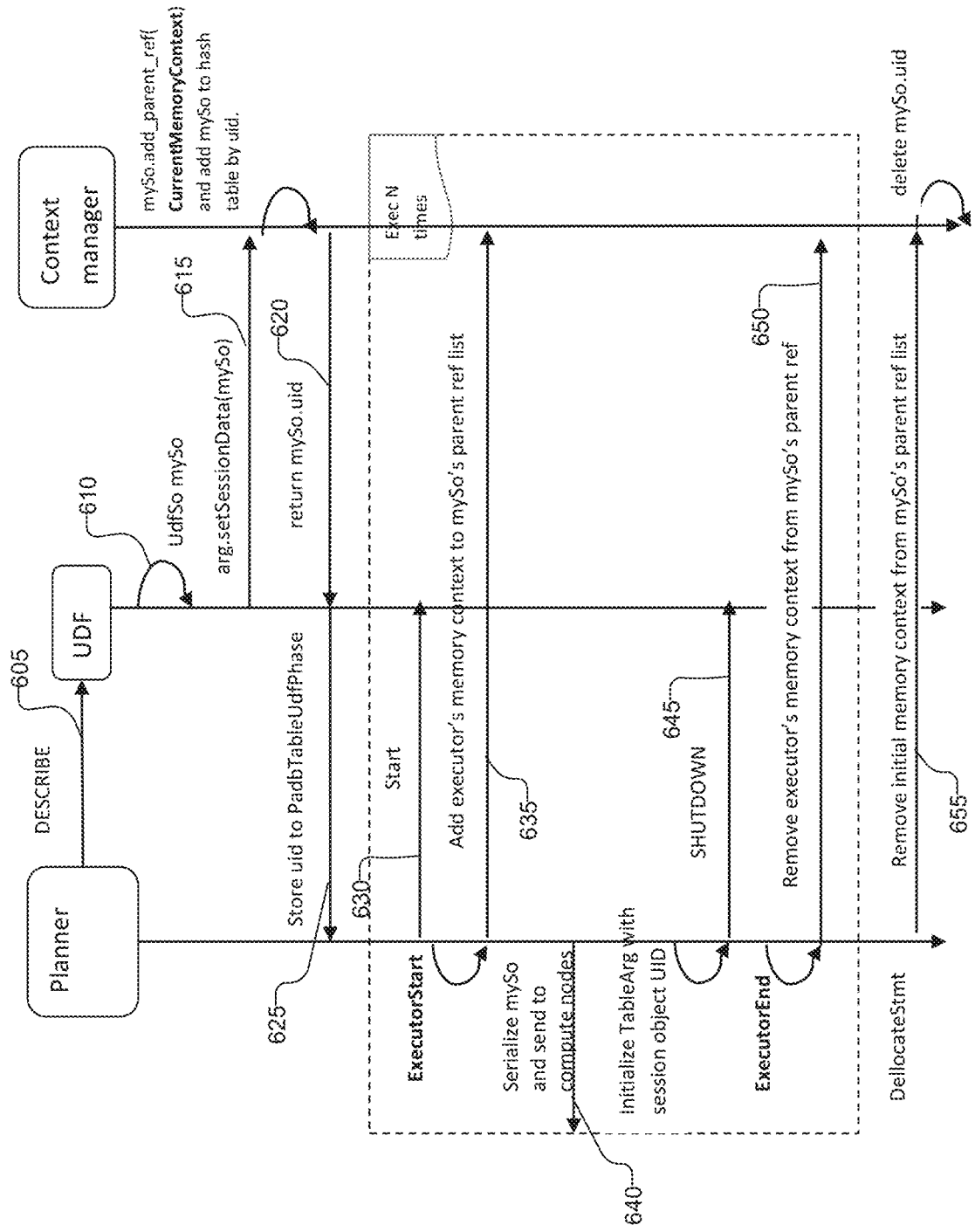
FIG. 6 shows an interaction diagram that describes the session object's life cycle and its parent references in prepared statement use cases, in accordance with an embodiment.

FIG. 6 shows an interaction diagram that describes the session object's life cycle and its parent references in prepared statement use cases, in accordance with an embodiment. The leader node includes a context manager. The purpose of context manager is to manage the parent references of session object such that the life-cycle of session object can be expanded across executions of the same prepared statement containing UDF. Specifically, a MemoryContext object is the type of parent reference which context manager needs to track with session object since a session object can out-live the originated MemoryContext. The planner invokes 605 the describe command of the UDF. The UDF initializes 610 the session object (illustrated as mySo). The UDF code invokes the method setSessionData to set up any required data structures in the context manager to represent the session object mySo. For example, the context manager may add the session object to a hash table. The context manager returns 620 an identifier mSo.uid of the session object to the UDF. The UDF sends 625 the uid value to the planner for storing. The start and shutdown methods of the UDF are invoked (630 and 645 respectively) by the planner for each execution of the UDF corresponding to the number of times execute is called on a prepared statement of the overall query. For each execution of the start method, the planner sends 635 information describing the memory context of the execute command to the context manager for storage. Accordingly, the context manager sets up any required structures to store information corresponding to each invocation of "execute" of the prepared statement. During shutdown 645, the planner removes 650, 655 the information describing the executor's memory context from the data structures stored in the context manager. The framework provides API for UDF writer to programmatically specify a list of columns for re-distribution.

As an example, a prepared statement may be executed iteratively (for example, in a for loop) multiple times. The global context may be used to remember the number of times the statements has been invoked. The iteration information may be input to the UDF and used within the logic of the UDF. For example, a UDF invocation may perform differently based on the iteration number associated with the invocation or based on the convergence criteria in a logistic regression or non-linear least squares analysis.

In an embodiment, each session object is first serialized to a string buffer during UDF code generation. The buffer is propagated to compute nodes as part of plan's parameters. At CREATE time on compute nodes, the session object becomes available after UDF call object deserialization. The write operations of global context may be disabled at CREATE-FINALIZE-DESTROY commands.

Specifying Global context in Create Function Statement

The definition of the global context may be specified at UDF creation time. In an embodiment, the global context is specified using the SQL interface. The SQL statement that specifies a global context is provides at create/install time of the UDF as opposed to the usage of the UDF. In an embodiment, the UDF receives the information necessary to create a global context using a database query, for example, an SQL query. The database queries used to create a global context query may be specified within the CREATE FUNCTION statement. This embodiment requires modifying the SQL implementation to support a "create function" statement that allows creation of "global context." Following is an example of a "create function" statement in which a query "SELECT * FROM mylookuptab AS mygc" is specified for creating a global context. The following SQL statements syntax refers to a global context as a "global context," however the syntax may be changed to refer to the global context in any other way.

CREATE FUNCTION myudf(x int) RETURNS int AS '/tmp/myudf.o' LANGUAGE C GLOBAL CONTEXT (SELECT * FROM mylookuptab AS mygc);

Another embodiment creates a global context object that is referenced from the "create function" statement. This embodiment uses a separate SQL statement to create the global context object. This embodiment simplifies the "create function" syntax compared to the previous implementation. Furthermore, the global context statement may be reused across multiple "create function" statements.

CREATE GLOBAL CONTEXT mygc AS SELECT * FROM mylookuptab;
CREATE FUNCTION myudf(x int) RETURNS int AS '/tmp/myudf.o' LANGUAGE C GLOBAL CONTEXT (mygc);

Another embodiment creates the global context object as a database view and references the global context object from the "create function" statement. The ability to use views allows use of complex SQL statements for creating the global context.

CREATE VIEW mygc AS SELECT * FROM mylookuptab
CREATE FUNCTION myudf(x int) RETURNS int AS '/tmp/myudf.o' LANGUAGE C GLOBAL CONTEXT (mygc)

A UDF external interface provides a mechanism to iterate over the results of the global context query. The global context query results are accessible via a parameter passed into the scalar or table UDF. The session query results may be provided as a list or simple array. An accessor function is used to get the results for a particular global context instance.

The following class definition provides an example implementation of global context data structure. The m_num rows variable provides the number of rows returned by the global context query and the m_rows structure points at the data returned by the query.

```
class GlobalContextData
{
    int m_num rows;
    RowDesc *m_rows;
    public:
        inline int getNumRows( )return m_num rows;
        inline RowDesc *getRow(int rownum){ return
            m_rows[rownum]; }
}
```

The RowDesc interface may be designed to be flexible so as to work with any schema. The RowDesc interface may use virtual functions to allow access to different types of schemas. These embodiments require modification of the SQL Parser to be able to parse the modified and new SQL statements. To instantiate global context data the SQL compiler builds subplan nodes for each global context query in plans that include UDFs with global context queries. These subplan nodes are passed to the backend for execution. The SQL compiler also enforces security rules for the global context queries. The backend of the SQL compiler executes the subplans for each global context used in a query and makes the results available to the UDFs on the compute nodes.

Specifying Global Context in UDF Source Code

In another embodiment, an SQLClient Interface is used to access data from the UDF code to set up the global context structure. The SQLClient interface is hidden from the external SQL user and it used by the UDF writer to dynamically construct the SQL statement for accessing the database to build the global context in the C++ source code. SQL statements can be executed during all UDF leader node commands. The UDF specification can make part or all of the SQL results available to compute node commands through the global context interface.

This approach does not require any change to existing CREATE FUNCTION syntax or any additional syntax like CREATE GLOBAL CONTEXT. The UDF writer can construct SQL statements dynamically based on named parameter values and other inputs. Furthermore, the UDF can execute INSERT/UPDATE/DELETE commands as well as multiple SELECT statements. As a result, the UDF writer has greater flexibility in the processing performed for building the global context.

The interface used by the UDF for dynamically executing SQL statements includes an application programming interface (API) to open a cursor and fetch results from a SQL query. A direct query execution interface may be used for executing SQL statements, such as DELETE/UPDATE/INSERT. Upon successful execution, this function returns number of rows affected by the input statement.

To prevent recursive invocations, the SQLClient is implemented as a C++ singleton class. Accordingly, only one instance of SQLClient per process can be instantiated at any given time. Creation of multiple SQLClient objects in the same block of code returns an error. However, creation of SQLClient objects in different blocks of code is allowed. SQLClient is only available at leader node commands. For example, A SQLClient error is thrown for functions that are performed by a compute node, for example a "process" function that is executed by the compute node for processing rows belonging to the slice processed by a compute node.

UDFs for Extract Transform and Load Operations

UDFs can be used to perform extract, transform, and load (ETL) operations using an external data source. This allows the database system to extract, transform, and load potentially large amounts of data originating from an external data source. In some embodiments, the data may be used immediately in a query rather than stored in the database as it is after loading. The process by which data from one query is fed as input to another query or from one phase of a UDF to the next phase of the UDF is referred to herein as streaming. When the database system performs streaming of data, as soon as data is processed for one phase or query, the data is made available for the next phase or query for processing. For example, if output of phase 1 is being processed as input of phase 2, as soon as the nth row is processed by phase 1, the nth row is made available for processing to phase 2. Similarly, if output of query 1 is being fed as input to query 2, as soon as the nth row is generated by query 1, the nth row is made available for processing to query 2. As a result, the data is processed as soon as it is ready for processing by subsequent phases/queries.

Examples of external data sources that can be used by the database system for ETL purposes include, parallel file systems that allow parallel I/O. Each compute node can read data in parallel from the file system thereby achieving high-performance in the ETL process. Another example of external data source is a parallel database, for example, another instance of a similar system or an entirely different configuration or parallel architecture. Examples of such configurations include a large enterprise that installs multiple instances of the parallel database system, for example, one for each branch or region. A centralized parallel database system may collect information from the multiple instances of the parallel database system for analytic purposes. ETL may be performed from any other type of parallel information source, for example, another type of parallel machine that allows parallel I/O. There does not have to be a one-to-one correspondence between the available parallel ports of the external system and the number of compute nodes in the parallel database system. For example, each compute node may connect to multiple ports to extract information or multiple compute nodes can connect to a single port. ETL can be performed from external systems that do not support parallel I/O. However, external systems that support parallel I/O can be efficiently utilized by the parallel database system with multiple compute nodes.

Conventional systems typically perform an offline step that executes the ETL operation. These systems load the data entirely and store it locally before processing it for any queries. However, not all data available from the external system may have to be stored locally in order to use it. For example, there may be applications where it may be possible to combine the data with information from tables available in the parallel database system such that the combined data is significantly less than the data imported. Accordingly, the processing may be performed without requiring as much storage as the data received from the external system. For several applications the data obtained from the external system may be larger than the capacity of the database system. However, embodiments allow processing of the data as it is read from the external source, thereby obviating the need to have such large storage at the database system. Embodiments execute a database query while the external data is being streamed so as to process it and then store the processed information.

In some embodiments, the parallel database extracts data from external source makes the data available for execution by a running query in the database engine and as the data is being extracted. The data may be made available on the stack of an executing database query thereby enabling the executing query to process the data as soon as any portion of the data is available. The extraction of data from the external systems is modeled as an operator of the database query executing in the database system. This execution is enabled by the generated code based on a UDF that specifies the ETL operation.

The ability to treat the data from the external data source as an operator of the query allows optimizations, for example, presenting the data extracted from the external system in a streaming fashion to a subsequent step of execution of the current query or to a step of execution of an outer query if the current query is nested within the outer query. Presenting the data extracted from the external data source in a streaming fashion allows the subsequent operators or steps of executions to allow processing the data as soon as a portion of the data is available without having to wait for the entire data set to be extracted and stored in the database. Accordingly, the subsequent processing may start as each row is available, a set of rows is available, or even a portion of a row is available. In contrast, conventional systems extract the complete data set from the external system so that it is locally stored as one or more tables in the database before processing is performed by any query. Therefore conventional systems require large amount of storage for the entire data set and also slow down the execution of the subsequent queries. In contrast, embodiments can process the data without having to store the entire data set. For example, if an analytic query returns a result that is much smaller in size than the data set being imported, each portion of data imported may be discarded as soon as that portion of data is processed. As a specific example, if the query is computing a simple sum of a column from the extracted data, the query can compute partial sums based on rows extracted and discard the rows instead of extracting all the rows and storing them. Furthermore, the execution of the overall query is efficient since subsequent steps do not have to wait for the extraction of the entire data set.

Furthermore, the UDF framework disclosed herein allows users of the database system to write user defined code that can extract such data from external systems and make it available to the database query execution for such efficient execution. In some embodiments, the UDF may generate the data locally without accessing any external data source. For example, the UDF may generate data by performing a mathematical process such generation of random numbers or generation of data having a particular type of data distribution (e.g., for testing purposes). The data generated by the UDF is presented in a streaming fashion to either a subsequent phase of the UDF or to an outer query, if the query invoking the UDF is nested within the outer query. An example of a query based on a UDF that generates data without using any input source is as follows. The following "datagen" takes as input the total number of data elements to be generated as input and automatically generates them based on a predefined data distribution criteria.

SELECT * from datagen(with totalnum(1000,000));

The UDF performing ETL may be a multiphase UDF such that a first phase performs extraction of the data from the external source and a second phase performs processing of the data. The data produced by the first phase of the UDF is presented for processing to the second phase of the UDF in streaming fashion, i.e., the second phase can begin processing of the data as it is made available by the first phase without having to wait for the entire first phase to complete. For example, the processing of the rows of the data may be performed for each row as it is received or on a set of rows at a time. The generated code for the UDF enables the streamed execution of the phases.

The database query invoking the ETL UDF may perform one or more analytic operations based on the data extracted from the external system. For example, the database query invoking the ETL UDF may pass the output of the ETL UDF to another UDF or a built in function. In these embodiments, the data extracted from the external system is produced in a streaming fashion for execution by an operator of the query that is part of the analytic operations. Accordingly, the execution of the ETL process is pipelined along with the execution of the analytic operation.

In an embodiment, an inner query may be nested within an outer query such that the inner query extracts and produces data from an external data source. The data produced by the inner query is presented for processing to the outer query in a streaming fashion, i.e., the outer query can begin processing of the data as it is made available by the inner query, for example, on a per row basis or a few rows at a time. Accordingly, the data extracted from the external data source does not have to be extracted completely before processing of the outer query is started. Furthermore, the data extracted from the external data source may never have to be stored in the database system since it can be consumed as it is produced. In some situations, the logic of the query may preclude streamed execution. For example, for particular queries, the logic may require the entire inner query to be executed before the outer query can begin execution. The database query planner recognizes these situations and generates code accordingly that may or may not perform streaming.

In an embodiment, the output of the UDF is joined with a table stored in the database system. The result of execution of the ETL UDF can be considered as another table that is being joined to the table stored in the database system. However, although the UDF allows the database query to treat the external data source as a table, the entire data from the external data source does not have to be stored locally in the database system for processing. The data extracted from the external system by the ETL UDF is presented in a streaming fashion to an operator that is part of the join operation of the query. Accordingly, the execution of the join operation can begin processing as soon as data extracted from the external system is available in the parallel database system, for example, the join processing can begin as soon as each row is available or a set of rows is available.

A database query may include a plurality of UDF invocations, each UDF extracting data from an external source. The plurality of UDF invocations may correspond to multiple invocations of the same UDF or invocations of different UDFs or combinations thereof. The query may perform some processing, for example, join the data extracted from multiple external data sources and/or perform analytic functions based on the data obtained from multiple external sources. The data extracted from the multiple external sources is presented in a streaming fashion to operators of the query or queries that perform subsequent processing, for example, steps of the join operation or the analytic operations.

An ETL UDF that processes data from or transmits data to external systems may request session information from external data source before execution starts at the compute nodes. The session information may be used to create one or more sessions with the external system for interacting with the external system. In an embodiment, the session to an external system is created by the leader node instead of each compute node initiating the session. The leader node may perform file operations, for example, read information from the file system to set up the data structure. Alternatively, the leader node may interact with external systems to set up the session data structure. For example, for extract, transform and load (ETL), each compute node may have to interact in parallel with a parallel file system or a source of information that allows retrieval of information in parallel. The leader node interacts with the source of the information to set up the required data structure and allocates the parallel I/O resources between the compute nodes before sending the information to each compute node. The compute nodes receive the information from the leader node to determine how to interact with the sources of information independently. As a result, the authentication information is acquired through a connection established by the leader node. The leader node communicates the session information to the compute nodes, for example, as part of the execution plan.

In an embodiment, the ETL UDF can be used to perform transaction management. The ETL UDF can be used as a bridge between the parallel database system 100 and other transactional data sources, to facilitate the management of transactions between the parallel database system 100 and external data source. For example, the UDF that performs the ETL operation may be invoked by an SQL statement that is executed in the context of a transaction. Multiple SQL statements may be executed within a transaction boundary thereby allowing one or more ETL operations or combinations or ETL operations along with operations based on data previously stored within the database to be completed within a transaction. For example, a large data set may be imported from an external data source, the result of the import processed against data within the database and a result of the processing sent to the same or another external data source, all within a transaction. Accordingly, if the transaction fails, all database changes rollback. On the other hand, if the transaction succeeds the database changes are committed.

In an embodiment, the external system is a second database system that can execute database queries. The database query executed by the first database system can be as follows:

SELECT * FROM externaldatabaseUDF('select * from externalTable');

The externaldatabaseUDF takes as input a string specifying a database query, for example, 'select * from externalTable' and sends it for execution to the external database system. The query executed in the external data system produces results, for example, rows of data. These rows of data is imported into the first database system and produced by the first phase of externaldatabaseUDF and produced via streaming to a second phase of the externaldatabaseUDF. Alternatively, the result of the above database query may be presented to an outer database query such that the data is streamed for execution by the outer query. Also alternatively, the result of the above database query may be directly loaded into a database table in parallel.

Figure 7:
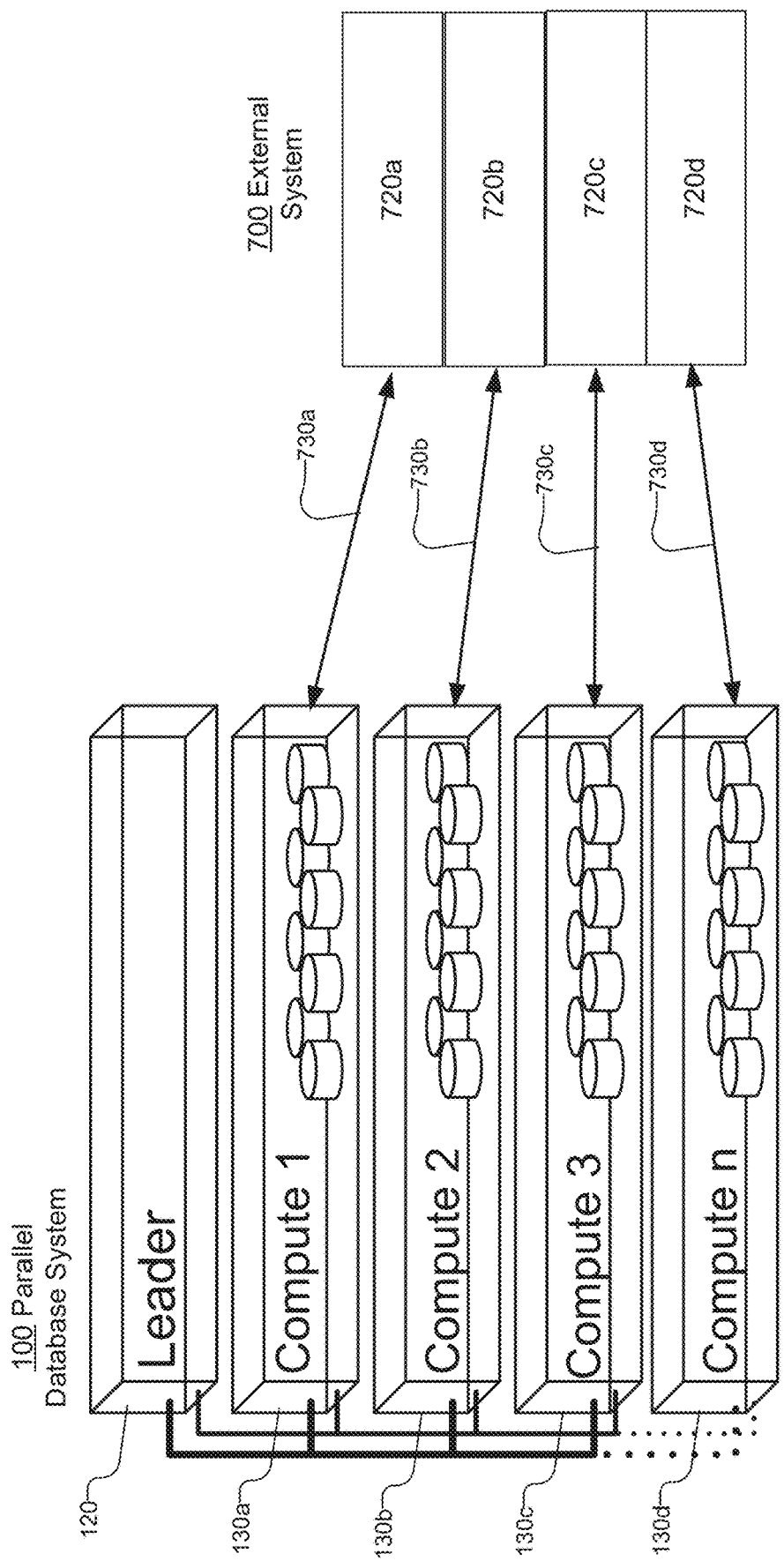
FIG. 7 illustrates a system utilizing the UDF framework for performing extract, transform, and load (ETL) operations from an external system, in accordance with an embodiment.

FIG. 7 illustrates a system utilizing the UDF framework for ETL from an external system, in accordance with an embodiment. The parallel database system 100 interacts with the external system 700 to extract data from the external system 700. In the configuration illustrated in FIG. 7, each compute node 130 performs data transfer 730 with a node 720 of the external system. The leader node 120 sets up any data structures needed by each compute node for accessing the external system 700 and performing the ETL operation. For example, the leader node 120 can perform authentication and pass a handle to each compute node so that each compute node does not have to perform authentication against the external system. These data structures are built stored in the global context structure and passed to the compute nodes via serialization/deserialization mechanism.

SQL Syntax Modifications

In an embodiment, the SQL syntax is modified to allow users to specify UDF definition for purposes of using the UDF as a source of data or information. UDFs that return asset of rows may be treated as a table. The CREATE FUNCTION command is used to create a UDF. A keyword TABLE is added indicating that the UDF is a table function. For example:

CREATE FUNCTION foo( )TABLE AS '/tmp/foo.o', 'foofunc' LANGUAGE 'C';

A keyword may be used in place of or in addition to TABLE. For example, a keyword DATASOURCE indicates that the UDF acts as a data source.

CREATE FUNCTION foo( )TABLE DATASOURCE AS '/tmp/foo.o','foofunc' LANGUAGE 'C';

Another keyword, DATATRANSFORM, may be used to specify that the UDF takes data as input and transforms it. For example:

CREATE FUNCTION foo2( )TABLE DATATRANSFORM AS '/tmp/foo.o','foofunc' LANGUAGE 'C';

A query that invokes the UDF may use an ON clause to specify the source of input rows and optional WITH clause followed by named parameters, for example:

SELECT * FROM foo(ON t1 WITH nps('xyzzy') npi(42) npcol(t1.a1));

In the above query invoking the "foo" UDF, three named parameters are shown, a constant of indeterminate type (which by default may be treated as a varchar), one integer-valued, and the last a reference to a column of the input row source, t1.

Embodiments disclosed herein allow UDFs to be inputless, for example, a UDF that generates data on its own. If the UDF is inputless then the following SQL statement may be used to invoke the UDF. The following example if UDF invocation does not specify any table name using the "ON" clause.

SELECT * FROM foo(WITH nps('xyzzy') npi(42));

To summarize, embodiments allow a parallel database to perform efficient import/export of data from/to an external system. The parallel database system received information describing the external system. The parallel database system receives a database query invoking an ETL UDF. The ETL UDF may comprise two or more phases: a first phase performing extraction of data from the external source and a second phase performing transformation of the data from the external source. Each compute node is responsible for performing processing of the UDF associated the compute node. For example, the compute node may be assigned a slice of data that is associated with a portion of data being imported or exported from/to the external system.

The code generator generates code for efficient execution of the ETL UDF. The leader node sends the generated code for the ETL UDF to each compute node. Each compute node receives the generated code based on the ETL UDF from the leader node. The leader node may determine information used for creating a session with the external system and store the information in the global context structure. Since the global context structure is reconstructed by each compute node, each compute node gets the information to establish a session with the external system. Each compute node establishes a session with the external system. If the external system has multiple ports, each compute node may connect to a separate port of the external session, depending on the number of ports available. Or else the set of compute nodes may be mapped to the set of ports available, for example, by the leader node.

Each compute node executes the first phase of the ETL UDF that allows the compute node to receive table data comprising rows from the external system. Each compute node streams the data obtained from the external system to the second phase. The streaming provides data extracted by the first phase to the second phase for transformation as the data is available. For example, each row may be presented to the second phase as soon as the row is extracted allowing the two phases to execute concurrently. In an embodiment, the leader node performs authentication of a session with the external system to allow the compute nodes to interact with the external system and passes the authentication information to the compute nodes as a session object.

In an embodiment the database query invoking the ETL UDF is an inner query that is nested within an outer query. The code generated for the ETL UDF is optimized so as to perform streaming of the execution of the data produced by the inner query with the outer query such that the data extracted from the external system by the inner query is transformed and produced to the outer query for every row as it is available. Accordingly, the processing of the inner query for all rows does not have to be completed at each compute node before the processing for the outer query is started. The planner may also generate an optimal plan for the inner and the outer query combined. For example, an operator associated with the outer query may be placed for execution before all the phases of the UDF are completed. In an embodiment, the generated code may extract a set of rows at a time and produce it to the next UDF phase or the outer query for processing.

The ETL process may be performed by database system executed by a single processor. A single processor execution of the ETL UDF also performs efficiently due to the streaming of execution of multiple phases as well as streaming of execution with an outer query.

Alternative Applications

Several embodiments are described herein using a parallel database architecture. However, other embodiments that are based on a single processor architecture are foreseeable. For example, the streaming of the UDF processing, the disclosed use of UDFs for extraction, transformation, and loading, code generation based architecture for processing UDFs, and other concepts disclosed herein can be executed on a database executing on a single processor or on a parallel architecture having a different configuration.

Furthermore, although the parallel architecture is disclosed herein as having a leader node and a plurality of compute nodes, other parallel configurations can be used. For example, any one of the compute nodes can act as a leader node. The parallel architecture can be based on a shared memory. Alternatively, the parallel architecture may comprise a distributed system of independent computers interconnected via a network.

The various features described herein can be used in combination with each other. For example, the global context can be used with UDFs for performing ETL. The SQLClient interface can be used to build a global context structure. The code generation architecture of processing UDFs can be used various types of UDF described herein or variations thereof. Global context structure can be used in multi-phase UDFs. Also, multi-phase UDFs can be used to perform ETL, for example, a phase of the UDF may extract the data from an external source, and a subsequent phase starts processing of the data.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A non-transitory computer readable storage medium storing instructions comprising:
   a user defined function (UDF) specified in a programming language, wherein the UDF comprises instructions for a plurality of call-back functions including:
      a describe call-back function configured to specify a schema describing data processed by the UDF, the schema identifying one or more columns of a database table, the database table being stored in a relational database and including multiple rows each having the one or more columns; and
      a process call-back function configured to perform a computation based on each row of the database table;
   instructions for receiving a database query specified in a database query language, the database query processing the database table and specifying an invocation of the UDF;
   instructions for executing, based on receiving the database query, the describe call-back function, wherein the describe call-back function executes at least part of the database query to determine the schema representing data to be subsequently processed during the invocation, by the database query, of the UDF, the schema identifying the one or more columns of the database table to be processed by the database query;
   instructions for generating code for processing during the invocation of the UDF by the database query, wherein the code is generated during a query planning phase of the database query, wherein the generated code is optimized for the invocation of the UDF based on the schema obtained from the describe call-back function, the generated code comprising representations of data objects based on the schema obtained by executing the describe call-back function;
   instructions for compiling the generated code to generate executable code for processing the database query; and
   instructions for generating, based on receiving the database query, results of the database query by executing the compiled executable code for each of a plurality of rows processed by the database query, wherein the process call-back function is invoked for each row of the database table.

2. The non-transitory computer readable storage medium of claim 1, wherein the schema is an output schema, wherein the describe call-back function comprises:
   instructions for receiving an input schema as input to the UDF and generating the output schema based on the input schema, wherein the input schema describes a structure of data input to the UDF during the invocation of the UDF and the output schema describes a structure of data output by the invocation of the UDF by the database query.

3. The non-transitory computer readable storage medium of claim 2, wherein the input schema identifies a first set of columns representing values input to the UDF and the output schema identifies a second set of columns representing values output by the UDF.

4. The non-transitory computer readable storage medium of claim 1, wherein the invocation of the UDF is a first invocation of the UDF, the database query is a first database query, and the schema generated is a first schema, wherein the describe call-back function comprises instructions for generating a second schema representing data processed during a second invocation of the UDF by a second database query.

5. The non-transitory computer readable storage medium of claim 1, wherein the UDF further comprises a finalize function comprising instructions for indicating that there are no more input rows for processing, the stored instructions further comprising:
   instructions for emitting any remaining output rows responsive to an execution of the finalize function indicating that there are no more input rows for processing.

6. The non-transitory computer readable storage medium of claim 1, wherein the database query processes a database table distributed across a plurality of processors, the stored instructions further comprising:
  instructions for sending the generated code to each of the plurality of processors for processing the portion of the database table stored on the processor.

7. The non-transitory computer readable storage medium of claim 1, wherein the UDF is a multi-phase UDF comprising a plurality of phases, wherein the describe call-back function specifies an input schema and an output schema for each phase of the multi-phase UDF.

8. The non-transitory computer readable storage medium of claim 1, wherein the UDF is a multi-phase UDF comprising a plurality of phases comprising a first phase and a second phase, wherein the describe function specifies a first partitioning strategy for partitioning data during the first phase and a second partitioning strategy for partitioning data during a second phase.

9. A method for executing database queries, the method comprising:
  storing a user defined function (UDF) specified in a programming language, wherein the UDF comprises instructions for a plurality of call-back functions including:
    a describe call-back function configured to specify a schema describing data processed by the UDF, the schema identifying one or more columns of a database table, the database table being stored in a relational database and including multiple rows each having the one or more columns; and
    a process call-back function configured to perform a computation based on each row of the database table;
  receiving a database query specified in a database query language, the database query processing the database table and specifying an invocation of the UDF;
  executing, based on receiving the database query, the describe call-back function, wherein the describe call-back function executes at least part of the database query to determine the schema representing data to be subsequently processed during the invocation, by the database query, of the UDF, the schema identifying the one or more columns of the database table to be processed by the database query;
  generating code for processing during the invocation of the UDF by the database query, wherein the code is generated during a query planning phase of the database query, wherein the generated code is optimized for the invocation of the UDF based on the schema obtained from the describe call-back function, the generated code comprising representations of data objects based on the schema obtained by executing the describe call-back function;
  compiling the generated code to generate executable code for processing the database query; and
  generating, based on receiving the database query, results of the database query by executing the compiled executable code for each of a plurality of rows processed by the database query, wherein the process call-back function is invoked for each row of the database table.

10. The method of claim 9, wherein the schema is an output schema, wherein the describe call-back function is configured to receive an input schema as input to the UDF and generate the output schema based on the input schema, wherein the input schema describes a structure of data input to the UDF during the invocation of the UDF and the output schema describes a structure of data output by the invocation of the UDF by the database query.

11. The method of claim 10, wherein the input schema identifies a first set of columns representing values input to the UDF and the output schema identifies a second set of columns representing values output by the UDF.

12. The method of claim 9, wherein the invocation of the UDF is a first invocation of the UDF, the database query is a first database query, and the schema generated is a first schema, wherein the describe call-back function is configured to generate a second schema representing data processed during a second invocation of the UDF by a second database query.

13. The method of claim 9, wherein the UDF further comprises a finalize function comprising instructions for indicating that there are no more input rows for processing, the method further comprising:
  emitting any remaining output rows responsive to an execution of the finalize function indicating that there are no more input rows for processing.

14. The method of claim 9, wherein the database query processes a database table distributed across a plurality of processors, the method further comprising:
  sending the generated code to each of the plurality of processors for processing the portion of the database table stored on the processor.

15. The method of claim 9, wherein the UDF is a multi-phase UDF comprising a plurality of phases, wherein the describe call-back function specifies an input schema and an output schema for each phase of the multi-phase UDF.

16. The method of claim 9, wherein the UDF is a multi-phase UDF comprising a plurality of phases comprising a first phase and a second phase, wherein the describe function specifies a first partitioning strategy for partitioning data during the first phase and a second partitioning strategy for partitioning data during a second phase.

17. A computer-system comprising:
  a computer processor; and
  a non-transitory computer readable storage medium storing instructions comprising:
    a user defined function (UDF) specified in a programming language, wherein the UDF comprises instructions for a plurality of call-back functions including:
      a describe call-back function configured to specify a schema describing data processed by the UDF, the schema identifying one or more columns of a database table, the database table being stored in a relational database and including multiple rows each having the one or more columns; and
      a process call-back function configured to perform a computation based on each row of the database table;
    instructions for receiving a database query specified in a database query language, the database query processing the database table and specifying an invocation of the UDF;
    instructions for executing, based on receiving the database query, the describe call-back function wherein the describe call-back function executes at least part of the database query to determine the schema representing data to be subsequently processed during the invocation, by the database query, of the UDF, the schema identifying the one or more columns of the database table to be processed by the database query;

instructions for generating code for processing during the invocation of the UDF by the database query, wherein the code is generated during a query planning phase of the database query, wherein the generated code is optimized for the invocation of the UDF based on the schema obtained from the describe call-back function, the generated code comprising representations of data objects based on the schema obtained by executing the describe call-back function;

instructions for compiling the generated code to generate executable code for processing the database query; and instructions for generating, based on receiving the database query, results of the database query by executing the compiled executable code for each of a plurality of rows processed by the database query, wherein the process call-back function is invoked for each row of the database table.

18. The computer system of claim 17, wherein the schema is an output schema, wherein the describe call-back function comprises instructions for receiving an input schema as input to the UDF and generating the output schema based on the input schema, wherein the input schema describes a structure of data input to the UDF during the invocation of the UDF and the output schema describes a structure of data output by the invocation of the UDF by the database query.

* * * * *